US012534581B2

(12) United States Patent
Phillips et al.

(10) Patent No.: US 12,534,581 B2
(45) Date of Patent: Jan. 27, 2026

(54) CLOSED-LOOP RECYCLING OF SCALABLE PLASTICS

(71) Applicant: Boise State University, Boise, ID (US)

(72) Inventors: Scott Phillips, Boise, ID (US); Allison Christy, Nampa, ID (US)

(73) Assignee: Boise State University, Boise, ID (US)

( * ) Notice: Subject to any disclaimer, the term of this patent is extended or adjusted under 35 U.S.C. 154(b) by 157 days.

(21) Appl. No.: 18/452,270

(22) Filed: Aug. 18, 2023

(65) Prior Publication Data

US 2024/0199825 A1    Jun. 20, 2024

Related U.S. Application Data

(60) Provisional application No. 63/371,917, filed on Aug. 19, 2022.

(51) Int. Cl.
| | | |
|---|---|---|
| *C08J 11/10* | (2006.01) | |
| *B29B 17/04* | (2006.01) | |
| *C08J 3/24* | (2006.01) | |

(52) U.S. Cl.
CPC ........... *C08J 3/247* (2013.01); *B29B 17/0404* (2013.01); *C08J 11/10* (2013.01); *B29K 2049/00* (2013.01); *C08J 2333/14* (2013.01)

(58) Field of Classification Search
USPC ....................................................... 528/422
See application file for complete search history.

(56) References Cited

U.S. PATENT DOCUMENTS

| | | | |
|---|---|---|---|
| 2,467,926 | A | 4/1949 | Ardis |
| 2,756,251 | A | 7/1956 | Joyner et al. |
| 3,444,233 | A | 5/1969 | Rabinowitz |
| 5,436,363 | A | 7/1995 | Wang et al. |
| 5,994,464 | A | 11/1999 | Ohsawa et al. |
| 8,475,825 | B2 * | 7/2013 | Liu ......................... A61L 24/06 424/423 |

OTHER PUBLICATIONS

"Acetic Acid," Ullman's Encyclopedia of Industrial Engineering, 2000, Wiley.
Andrussow, "The catalytic oxidation of ammonia-methane-mixtures to hydrogen cyanide," Angewandte Chemie, 1935, vol. 48, No. 37, pp. 593-595.
Ansys Granta Edupack Software, 2021, 5 pages.
Appl, "The Haber-Bosch process and the development of chemical engineering." A century of chemical engineering, 1982, pp. 29-54.
Balema et al., "Depolymerization of polystyrene under ambient conditions," New Journal of Chemistry, 2021, vol. 45, pp. 2935-2938.
Barkan et al. "Comparative evaluation of polycyanoacrylates." Acta Biomaterialia, 2017, vol. 48, pp. 390-400.
Calvo-Flores et al., "Green and Bio-Based Solvents," Top Curr Chem, 2018, vol. 376, No. 18, 40 pages.
Chrobadjiev et al., "Study of the thermal degradation of polyalkyl-cyanoacrylates," Eur Polym J, 1991, vol. 27, pp. 1009-1015.
Couvreur, "Poly-cyanoacrylate nanomedicines for cancer and beyond: Lessons Learned," Journal of Controlled Release, 2021, vol. 334, pp. 318-326.
Damodar et al., "Nitrogen-doped graphene-like carbon nanosheets from commercial glue: morphology, phase evolution and Li-ion battery performance," Dalton Transactions, 2018, vol. 47, pp. 12218-12227.
Doi et al., "The theory of polymer dynamics," Clarendon Press, Oxford University Press, New York, 1986, pp. 391.
Duffy et al., "Radical Polymerization of Alkyl 2-Cyanoacrylates," Molecules, 2018, vol. 23, No. 465, pp. 1-21.
Eromosele et al., "Water effects on the zwitterionic polymerization of cyanoacrylates," 1989, vol. 190, pp. 1613-1622.
Estan-Cerezo et al. "Structural and adhesion properties of poly (ethyl 2-cyanoacrylate) post-cured at different temperatures and times," Journal of Adhesion Science and Technology, 2019, vol. 33, No. 4, pp. 329-345.
Fink, "Chapter 13-Cyanoacrylates," Reactive Polymers Fundamentals and Applications, Elsevier, London, UK, ed. 2, 2013, pp. 317-330.
Fontecha et al., "Tracking the complete degradation lifecycle of polyethyl cyanoacrylate: From induces photoluminescence to nitrogen-doped nano-graphene precursor residue," Polym Degrad Stab, 2022, vol. 195, No. 109772.
Geyer et al., "Production, use, and fate of all plastics ever made," Sci Adv, 2017, vol. 3, pp. 25-29.
Han et al., "Synthesis and degradation behavior of poly(ethyl cyanoacrylate)," Polym Degrad Stab, 2008, vol. 93, pp. 1243-1251.
Hart et al., "Increased fracture toughness of additively manufactured amorphous thermoplastics via thermal annealing," Polymer, 2018, vol. 144, pp. 192-204.
Huang et al., "Chemical Recycling of Polystyrene to Valuable Chemicals via Selective Acid-Catalyzed Aerobic Oxidation under Visible Light," J Am Chem Soc, 2022, vol. 144, pp. 6532-6542.
Klemarczyk et al., "Advances in anaerobic and cyanoacrylate adhesives," Advances in Structural Adhesive Bonding, Elsevier 2010, pp. 96-131.
Kumar et al., "Efficient Depolymerization of Polystyrene with Table Salt and Oxidized Copper," ACS Sustain Chem Eng, 2022, vol. 10, pp. 6493-6502.

(Continued)

*Primary Examiner* — Terressa Boykin
(74) *Attorney, Agent, or Firm* — McKee, Voorhees & Sease, PLC

(57) ABSTRACT

The present disclosure relates to a nontoxic poly(ethyl cyanoacrylate) (PECA) plastic. The PECA-based plastic is sourced from non-petroleum feedstocks and can be thermally and/or mechanically converted back to the ethyl cyanoacrylate monomer in a closed-loop recycling system with high monomer recovery. The disclosure also provides for methods of making the PECA plastics and methods of recycling the PECA plastics.

19 Claims, 14 Drawing Sheets

(11 of 14 Drawing Sheet(s) Filed in Color)

(56) References Cited

OTHER PUBLICATIONS

Lee, "Cyanoacrylate Resins—The Instant Adhesives," Pasadena Technology Press, Los Angeles, 1986.

Leggat et al., "Toxicity of Cyanoacrylate Adhesives and Their Occupational Impacts for Dental Staff," Ind. Health, 2004, vol. 42, pp. 207-211.

Maharana et al., "Review Article: Recycling of Polystyrene," Polym Plast Technol Eng., 2007, vol. 46, pp. 729-736.

Masood et al. "Highly Transparent Polyethylcyanoacrylates from Approved Eco-Friendly Fragrance Materials Demonstrating Excellent Fog-Harvesting and Anti-Wear Properties." ACS Appl. Mater. Interfaces, 2018, vol. 10, No. 40, pp. 34573-34584.

Mele et al., "Zwitterionic Nanofibers of Super-Glue for Transparent and Biocompatible Multi-Purpose Coatings," Scientific Reports, 2015, vol. 5, pp. 1-13.

Millet, "Cyanoacrylate adhesives," Structural Adhesives: Chemistry and Technology, 1986, pp. 249-307.

Okamoto et al., "Primers for Bonding Polyolefin Substrates with Alkyl Cyanoacrylate Adhesive," J. Adhes., 1993, vol. 40, pp. 81-91.

Peters et al., "Thermoplastics, Thermosets, and Elastomers—Description and Properties," Mechanical Engineers' Handbook, vol. 1: Materials and Engineering Mechanics, John Wiley & Sons, Inc., ed. 4, 2015, vol. 1, pp. 362.

Petrie, "Cyanoacrylate adhesives in surgical applications: a critical review," Rev. Adhesion Adhesives, 2014, vol. 2, pp. 253-310.

Quilez-Molina et al., "Uv-blocking, transparent, and antioxidant polycyanoacrylate films," Polymers Basel, 2020, vol. 12, pp. 1-20.

Ragaert et al., "Design from recycling: A complex mixed plastic waste case study," Resour Conserv Recycl, 2020, vol. 155, No. 104646.

Raja, "Cyanoacrylate Adhesives: A Critical Review," Review Adhesion Adhesives, 2016, vol. 4, pp. 398-416.

Reuss et al., "Formaldehyde," Ullman's Encyclopedia of Industrial Engineering, 2000.

Robello et al., "Degradation and Stabilization of Polycyanoacrylates," J Polym Sci A, 1999, vol. 37, pp. 4570-4581.

Rooney, "On the mechanism of oligomer formation in condensations of alkyl cyanoacetates with formaldehyde," Polym J, 1983, vol. 13, pp. 947-953.

Ryan et al. "Novel subceiling temperature rapid depolymerizationrepolymerization reactions of cyanoacrylate polymers." Macromolecular rapid communications 17.4 1996: 217-227.

Tripodo et al., "Highly Flexible Poly ethyl2cyanoacrylate Based Materials Obtained by Incorporation of Oligo ethylene glycol diglycidylether," Macromolecular Symposia, 2011, vols. 309-310, pp. 49-58.

Vauthier et al., "Poly(alkylcyanoacrylates) as biodegradable materials for biomedical applications," Adv Drug Deliv Rev, 2003, vol. 55, pp. 519-548.

* cited by examiner

CLOSED-LOOP RECYCLING OF SCALABLE PLASTICS

CROSS-REFERENCE TO RELATED APPLICATIONS

This application claims priority under 35 U.S.C. § 119 to provisional application Ser. No. 63/371,917 filed Aug. 19, 2022 herein incorporated by reference in its entirety.

STATEMENT REGARDING FEDERALLY SPONSORED RESEARCH

This invention was made with government support under Grant Number W911NF2010193 awarded by the Army Research Office. The government has certain rights in the invention.

TECHNICAL FIELD

The present disclosure relates to a nontoxic plastic capable of closed-loop recycling that is sourced from non-petroleum feedstocks. Specifically, the present disclosure is directed to a poly(ethyl cyanoacrylate) (PECA) plastic that can be thermally and/or mechanically converted back to the ethyl cyanoacrylate monomer in a closed-loop recycling system with high monomer recovery.

BACKGROUND

There are several challenges related to the use of traditional plastics. Most known plastics are made from petroleum rather than from more environmentally friendly precursors. Additionally, recycling and re-use of post-consumer plastics is energy-intensive, time-intensive, and inefficient, thus leading to pollution and accumulation of plastic waste in landfills.

There exists a need for plastics, in particular the polymers that are used to make plastics, that have one or more of the following characteristics: (i) derived from non-petroleum starting materials; (ii) easy to recycle in a closed-loop process that uses few separation or sorting steps so that recycling is efficient and cost-competitive with virgin polymer; (iii) the mechanical properties of the recycled plastics remain relatively unaltered; (iv) scalable and economically-competitive with existing petroleum-based products; and (v) will possess mechanical properties that are commensurate with commercial plastics.

Poly(ethyl cyanoacrylate) is non-toxic and accessible through the low-cost, non-petroleum-based ethyl cyanoacrylate monomer. However, ethyl cyanoacrylate rapidly and uncontrollably polymerizes and has the propensity to stick to most common materials. Thus, known applications of poly(ethyl cyanoacrylate) are limited to instant adhesives and medical systems, with few exceptions.

BRIEF SUMMARY OF THE INVENTION

Disclosed herein is a method for preparing a poly(ethyl cyanoacrylate) plastic comprising polymerizing an ethyl cyanoacrylate monomer by combining the ethyl cyanoacrylate monomer with an initiator comprising a tertiary amine, a phosphine, an amine, an amine oxide, a betaine, a sulfoxide, or combinations thereof to form a poly(ethyl cyanoacrylate), and curing the poly(ethyl cyanoacrylate) to form a poly(ethyl cyanoacrylate) plastic. In embodiments, the initiator comprises dimethylformamide, trimethyl amine N-oxide, trimethylglycine, or dimethyl sulfoxide, or a combination thereof. In embodiments, the polymerizing occurs at ambient temperature or below, and wherein the curing occurs at ambient temperature or above. In embodiments, the repolymerization and/or curing occurs in a vessel comprising poly(ethylene) or poly(propylene). In embodiments, the ethyl cyanoacrylate is combined with sub-stoichiometric quantities of the initiator.

In embodiments, the method further comprises annealing the poly(ethyl cyanoacrylate) at a temperature of from about 120° C. to about 150° C. for about 1 minute to about 60 minutes. In embodiments, the annealed poly(ethyl cyanoacrylate) plastic comprises a tensile strength of from about 15 MPa to about 30 Mpa, an elongation at break percentage of from about 20% to about 50%, a Hardness Shore D value of from about 60 to about 80, a density of from about 1 g/mL to about 2 g/mL, an average molecular weight of from about 50 kDa to about 5,000 kDa, and an average polydispersity index of about 1.0 to about 1.4.

In embodiments, the method further comprises thermoforming the poly(ethyl cyanoacrylate) plastic into an article or product, or wherein the curing occurs in a mold to prepare a product or article comprising the poly(ethyl cyanoacrylate) plastic. In embodiments, the polymerization further comprises an additional component comprising a dye, a pigment, a fragrance, a solvent, a carrier, a thickener, a solidifying agent, a clarifying agent, a decoration, or mixtures thereof.

Disclosed herein is an article or product comprising the poly(ethyl cyanoacrylate) plastic prepared by the methods disclosed here.

Disclosed herein is a method for recycling the poly(ethyl cyanoacrylate) plastic disclosed herein comprising mechanical depolymerizing the poly(ethyl cyanoacrylate) plastic via mechanical forces, repolymerizing poly(ethyl cyanoacrylate) plastic by heat pressing; and optionally repeating the depolymerizing and repolymerizing at least two times, at least three times, or at least four times. In embodiments, the mechanical forces comprise grinding or milling the poly(ethyl cyanoacrylate) plastic into a powder, and the heat-pressing comprises heating the powder to a temperature of from about 110° C. to about 175° C. and then pressing the powder into a PECA polymer.

Disclosed herein is a method of recycling a poly(ethyl cyanoacrylate) plastic comprising depolymerizing the poly(ethyl cyanoacrylate) plastic into an ethyl cyanoacrylate monomer by combining the poly(ethyl cyanoacrylate) plastic with a reagent comprising hydroquinone, molecular sieves, sodium sulfate, magnesium sulfate, calcium carbonate, or phosphorus pentoxide, or a combination thereof, heating the poly(ethyl cyanoacrylate) plastic and reagent to a temperature of from about 180° C. to about 220° C., and extracting the ethyl cyanoacrylate monomer, and repolymerizing the ethyl cyanoacrylate monomer into poly(ethyl cyanoacrylate) plastic by combining the ethyl cyanoacrylate monomer with an initiator comprising a tertiary amine, a phosphine, an amine, an amine oxide, a betaine, a sulfoxide, or combinations thereof to form a poly(ethyl cyanoacrylate), and curing the poly(ethyl cyanoacrylate) to form a repolymerized poly(ethyl cyanoacrylate) plastic. In embodiments, the extracting occurs by distillation, and wherein the depolymerization yields at least about 75% monomer. In embodiments, the initiator comprises dimethylformamide, trimethyl amine N-oxide, trimethylglycine, or dimethyl sulfoxide, or a combination thereof and the ethyl cyanoacrylate is combined with sub-stoichiometric quantities of the initiator. In embodiments, the repolymerizing occurs at ambient temperature or below, and wherein the curing occurs at ambient temperatures or above, and/or wherein the repolymerizing and/or curing occurs in a vessel comprising poly(ethylene) or poly(propylene).

In embodiments, the repolymerization further comprises annealing the poly(ethyl cyanoacrylate) at a temperature of from about 120° C. to about 150° C. for about 1 minutes to about 60 minutes. In embodiments, the repolymerized poly(ethyl cyanoacrylate) plastic comprises a tensile strength of from about 15 MPa to about 30 MPa, an average molecular weight of from about 50 kDa to about 5,000 kDa, an average polydispersity index of about 1.0 to about 1.4. In embodiments, the poly(ethyl cyanoacrylate) plastic is a part of a waste stream comprising other plastics, contaminants, or combinations thereof and yields at least about 50% monomer, and optionally wherein the poly(ethyl cyanoacrylate) and other plastics are separated from the contaminants prior to depolymerization and the depolymerization yields at least about 75% monomer.

Disclosed herein is an article or product comprising the repolymerized poly(ethyl cyanoacrylate) plastic prepared by the method disclosed herein.

BRIEF DESCRIPTION OF THE FIGURES

The patent or application file contains at least one drawing executed in color. Copies of this patent or patent application publication with color drawing(s) will be provided by the Office upon request and payment of the necessary fee.

The following drawings form part of the specification and are included to further demonstrate certain embodiments. In some instances, embodiments can be best understood by referring to the accompanying figures in combination with the detailed description presented herein. The description and accompanying figures may highlight a certain specific example, or a certain embodiment. However, one skilled in the art will understand that portions of the example or embodiment may be used in combination with other examples or embodiments.

Figure 1:
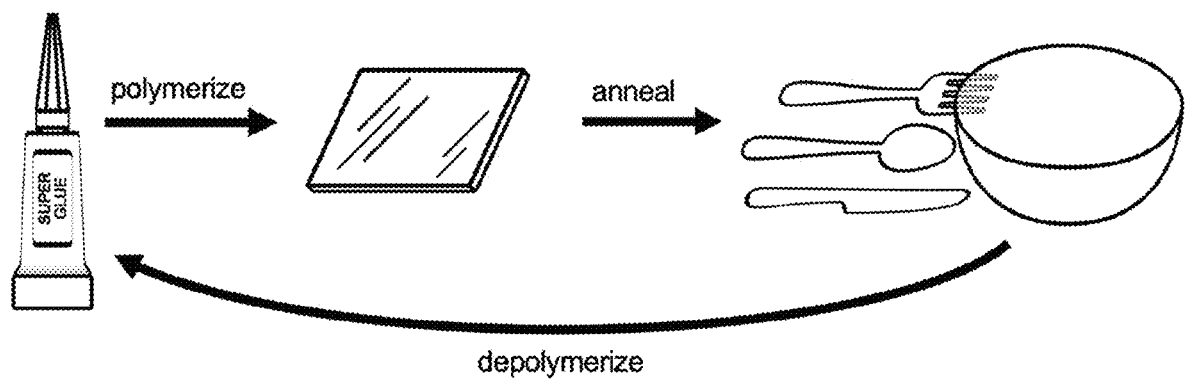
FIG. 1 is a schematic of the formation and recycling lifecycle of an PECA plastic.

Reference to various embodiments does not limit the scope of the invention. Figures represented herein are not limitations to the various embodiments according to the invention and are presented for exemplary illustration of the invention.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

The present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numerical values within that range, for example, 1, 2, 3, 4, 5, and 6, and decimals and fractions, for example, 1.2, 3.8, 1½, and 4¾ This applies regardless of the breadth of the range.

As used herein, the term "exemplary" refers to an example, an instance, or an illustration, and does not indicate a preferred embodiment unless otherwise stated.

The term "about," as used herein, refers to variations in size, distance or any other types of measurements that can be resulted from inherent heterogeneous nature of the measured objects and imprecise nature of the measurements itself, including, but not limited to, temperature, mass, volume, weight, density, hardness, strength, thickness, ratios, and percentages. The term "about" also encompasses variation in the numerical quantity that can occur, for example, through typical measuring or handling procedures in the real world; through inadvertent error in these procedures; through differences in the manufacture, source, or purity of the ingredients used to make the device or carry out the methods, and the like. Whether or not modified by the term "about", the claims include equivalents to the quantities.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The methods and compositions of the present disclosure may comprise, consist essentially of, or consist of the components and ingredients of the present disclosure as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The "invention" is not intended to refer to any single embodiment of the particular invention but encompass all possible embodiments as described in the specification and the claims. The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

The disclosure herein is related to plastics based on poly(ethyl cyanoacrylate) (PECA). PECA is preferably prepared from the monomer ethyl cyanoacrylate. This monomer is more commonly known by the trade names Super Glue and Krazy Glue. In Super Glue, the highly electrophilic ethyl cyanoacrylate monomer rapidly polymerizes anionically between two substrates via initiation caused by adventitious water or by surface functionality. Abundant initiation events lead to short polymers (e.g. PDI of 1.56, with an average molecular weight in the 30 kDa range) acceptable for adhesives, but do not lead to plastics with good mechanical properties. Long polymers are needed for plastics.

Figure 2:
FIG. 2 is a photograph of an exemplary transparent PECA plastic.

An example of the formation and recycling lifecycle of a PECA plastic is shown in FIG. 1. In FIG. 1, an ethyl cyanoacrylate monomer is polymerized and cured. The PECA polymer is then annealed and formed into a plastic product. An example of a transparent PECA plastic is shown in FIG. 2. As demonstrated in FIG. 1, a product comprising PECA plastic can be depolymerized back into the ethyl cyanoacrylate monomer in a closed loop recycling system.

As used herein "closed-loop" recycling is an approach that includes recycling a plastic material into the starting monomer of that plastic, and then repolymerizing said monomer.

Poly(ethyl cyanoacrylate) Polymers

Disclosed herein is a plastic comprising poly(ethyl cyanoacrylate) (PECA) polymers. The PECA monomer, ethyl cyanoacrylate, is currently produced on an industrial scale making PECA readily scalable and economical. In an embodiment, the monomer is a different species containing the cyanoacrylate functional group. For example, the monomer may comprise methyl cyanoacrylate, n-butyl cyanoacrylate, octyl cyanoacrylate, or isobutyl cyanoacrylate.

The monomer ethyl cyanoacrylate is prepared from methanol, chloroacetic acid, and sodium cyanide, which are reagents that are sourced from hydrogen, nitrogen, methane, carbon monoxide, chlorine, and sodium hydroxide, all of which are starting materials that are generated from feedstocks other than petroleum. Both the monomer and PECA are non-toxic and biodegradable.

PECA rarely has been used outside of the context of when it is formed in situ during polymerization of ethyl cyanoacrylate adhesive. This scarcity of use is attributed to the fact that polymerization of the monomer yields polymer adhered to surfaces.

In an embodiment, the PECA plastic as described herein has a polydispersity index of from about 1.0 to about 1.4, or from about 1.02 to about 1.30. As used herein, polydispersity index (PDI) refers to the distribution of molecular mass in a given polymer. PDI is calculated by the dividing $M_w$ by $M_n$. $M_w$ is the weight average molecular weight and $M_n$ is the number average molecular weight.

In an embodiment, the PECA plastic as described herein comprises a $M_n$ of from about 50 kDa to about 5,000 kDa, or from about 100 to about 2,000 kDa. In an embodiment, the PECA plastic as described herein comprises a $M_n$ of at least about 50 kDA, at least about 100 kDa, at least about 1,000 kDa, or at least about 5,000 kDa.

In an embodiment, the PECA plastic as described herein comprises a tensile strength of from about 15 MPa to about 30 MPa, or from about 17 MPa to about 27 MPa.

In an embodiment, the PECA plastic as described herein comprises a compressive strength of from about 30 MPa to about 70 MPa, or from about 40 MPa to about 60 MPa.

In an embodiment, the PECA plastic as described herein comprises an elongation at break percentage of from about 20% to about 50%, or from about 32% to about 46%.

In an embodiment, the PECA plastic as described herein comprises a density of from about 1 g/mL to about 2 g/mL, or from about 1.05 g/mL to about 1.2 g/mL.

In an embodiment, the PECA plastic as described herein comprises a Hardness Short D value of from about 60 to about 80, or from about 65 to about 75.

In an embodiment, the PECA plastic as described herein comprises a Young's Modulus of from about 0.15 GPa to about 0.5 GPa, or from about 0.2 GPa to about 0.4 GPa.

In an embodiment, the PECA plastic as described herein comprises a glass transition temperature of from about 105° C. to about 115° C., or of about 110° C.

In an embodiment, the PECA plastic is substantially transparent.

In an embodiment, the PECA plastic comprises additional components. In an embodiment, the additional components comprise a dye, a pigment, a fragrance, a solvent, a carrier, a thickener, a solidifying agent, a clarifying agent, or a decoration (glitter, etc.), or mixtures thereof. In an embodiment, the additional components are non-toxic.

In an embodiment, the PECA plastic does not comprise a plasticizer.

The PECA plastic as described herein can have any shape, size, color, and/or level of detail as known in the art for a plastic or polymeric material.

The PECA plastic materials as described herein have similar physical properties as one or more other common plastics as known in the art.

Methods of Producing a PECA Plastic

Depending on the type of nucleophilic initiator, ethyl cyanoacrylate undergoes anionic or zwitterionic polymerization through a stable carbanion intermediate that allows for propagation to occur until all monomer is consumed. The method described herein slows the rate of polymerization and lengthens the curing time to create plastics composed of long molecular weight polymers, where long molecular weight polymers have better entanglement than shorter polymers, and thus lead to improved mechanical properties in plastics.

A method of preparing a PECA plastic is described herein. In an embodiment, the method comprises polymerizing an ethyl cyanoacrylate monomer by combining the ethyl cyanoacrylate monomer with an initiator form a poly(ethyl cyanoacrylate), and then curing the PECA to form a plastic material. In an embodiment, the monomer is a different species containing the cyanoacrylate functional group. For example, the monomer may comprise methyl cyanoacrylate, n-butyl cyanoacrylate, octyl cyanoacrylate, or isobutyl cyanoacrylate.

As used herein, polymerizing, or polymerization, refers to the linking of monomer units into a polymeric compound. As used herein, curing refers to the hardening or toughening of the polymer, including into a solid form. Curing may include cross-linking. Polymerization and curing are herein described as two distinct steps, however there may be overlap between the two.

In an embodiment, the initiator is a weak nucleophile. In an embodiment, the initiator is chosen to allow for polymerization and/or cure times on the order of hours. In an embodiment, the initiator is non-toxic. In an embodiment, the initiator comprises a tertiary amine, a phosphine, an amine, an amine oxide, a betaine, a sulfoxide, or combinations thereof. In an embodiment, the initiator comprises dimethylformamide, trimethyl amine N-oxide, trimethylglycine, or dimethyl sulfoxide, or a combination thereof. In an embodiment, the initiator comprises dimethyl sulfoxide. In an embodiment, the monomer is combined with sub-stoichiometric quantities of the initiator. In an embodiment, single percent mole equivalents of the initiator are utilized. In an embodiment, the amount of initiator is chosen to such that the polymerization occurs in a certain amount of time, for example 1 hour, 12 hours, 24 hours, 48 hours or more than 24 hours. In an embodiment, the amount of initiator is chosen to generate a specific molecular weight of the resultant polymer, for example a Mn of from about 50 to about 5,000 kDa, or more.

In an embodiment, the polymerization of PECA occurs at ambient conditions. In an embodiment, the polymerization of PECA occurs at temperatures below ambient. In an embodiment, the polymerization occurs at temperatures below about 22.2° C., below about 21° C., below about 19° C., below about 16° C., below about 13° C., or below about 10° C.

In an embodiment, the curing of PECA occurs at ambient conditions. In an embodiment, the curing of PECA occurs at temperatures below ambient. In an embodiment, the curing occurs at temperatures below about 22.2° C., below about 21° C., below about 19° C., below about 16° C., below about 13° C., or below about 10° C.

In an embodiment, the polymerization and curing steps occur in the same vessel. In an embodiment, the polymerization and curing steps occur in separate vessels.

In an embodiment, the polymerization and/or curing of the PECA polymer occurs in a vessel comprising a material to which the in situ formed PECA and/or ethyl cyanoacrylate do not adhere. In an embodiment, the polymerization and/or curing occurs in a vessel comprising poly(ethylene), poly(propylene), or mixtures thereof.

The monomer and initiator can be combined by any means known in the art, for example in a mixer, by hand, by stirring, shaking, vibrating, and the like.

In an embodiment, the polymerization takes at least about 1 hour, at least about 6 hours, at least about 12 hours, at least about 24 hours, or at least about 48 hours. In an embodiment, the curing takes at least about 1 hour, at least about 6 hours, at least about 12 hours, at least about 24 hours, or at least about 48 hours.

In an embodiment, the method comprises annealing the cured poly(ethyl cyanoacrylate). In an embodiment, the method comprises thermally annealing the PECA. Thermal annealing can occur be any means as known in the art, for example in an oven, under vacuum, in a fluid, and the like. In an embodiment, the method comprises annealing the PECA at a temperature above the exothermic transition, but below the onset of thermal decomposition. In an embodiment, the annealing occurs at a temperature of from about 115° C. to about 240° C. In an embodiment, the annealing occurs at a temperature of from about 120° C. to about 150° C., or at about 130° C. In an embodiment, the method comprising an annealing step that takes as long as is necessary to completely anneal the PECA plastic. In an embodiment, the annealing takes from about 1 minute to about 60 minutes. In an embodiment, the annealing takes from about 10 minutes to about 30 minutes. In an embodiment, the annealing takes longer than 30 minutes. After annealing, the PECA plastic may be partially or completely annealed.

In an embodiment, the annealed PECA plastic has a glass transition temperature of about 105° C. to about 115° C. In an embodiment, the annealed PECA plastic has a glass transition temperature of about 110° C. In an embodiment, the annealed PECA plastic has a tensile strength of about 15 MPa to about 30 MPa, or from about 17 MPa to about 27 MPa. In an embodiment, the annealed PECA plastic has an elongation at break of about 20% to about 50%. In an embodiment, the PECA plastic has an elongation at break of about 22% to about 46%. In an embodiment, the annealed PECA plastic has density of from about 1 g/mL to about 2 g/mL, or from about 1.05 g/mL to about 1.2 g/mL.

In an embodiment, the PECA plastic produced from the methods described herein comprise an average molecular weight of from about 50 kDa to about 5,000 kDa, or from about 100 kDa to about 2,000 kDa. In an embodiment, the PECA plastic produced from the methods described herein comprise a PDI of from about 1.0 to about 1.4, or from about 1.02 to about 1.3.

In an embodiment, the method of manufacturing a PECA plastic comprises manipulating the PECA plastic into any shape, size, color, and/or level of detail as known in the art for a plastic or polymeric material. In an embodiment, a product comprising the PECA plastic by the methods described herein are made as-cast, cured in the mold for said product. In an embodiment, a product comprising the PECA plastic produced by the methods described herein are made by thermoforming. In an embodiment, products or articles comprising the PECA plastic are manufactured with any method as known for plastics or polymers, including extrusion, molding, 3D printing, casting, thermoforming, compression molding, vacuum forming, heat pressing and the like. In an embodiment, the method comprising manufacturing or manipulating the PECA plastic with tools as known in the art, for example hand saws, power saws, planes, chisels, mallets, hammers, sanders, and the like.

In an embodiment of the method, additional components are added during the polymerization and/or curing steps. The additional components comprise a dye, a pigment, a fragrance, a solvent, a carrier, a thickener, a solidifying agent, a clarifying agent, a decoration (glitter, etc.), or mixtures thereof. In an embodiment, the additional components are non-toxic and natural.

Closed-Loop Recycling: Mechanical Depolymerization

In an embodiment, a method for recycling PECA plastic comprises mechanically depolymerizing the PECA plastic. In an embodiment, the mechanical depolymerization comprises mechanically processing the PECA plastic to decrease the length of the polymer. In an embodiment, the mechanical depolymerization comprises processing the PECA plastic into a powder. The mechanical processing of the PECA plastic can occur by any means known in the art, for example grinding, milling, cutting, crushing, sanding, and the like. In an embodiment, at least a portion of the PECA depolymerizes into the ethyl cyanoacrylate monomer. In an embodiment, the monomer is a different species containing the cyanoacrylate functional group. For example, the monomer may comprise methyl cyanoacrylate, n-butyl cyanoacrylate, octyl cyanoacrylate, or isobutyl cyanoacrylate.

In an embodiment, the monomer powder is subsequently polymerized by heat pressing. In an embodiment, the polymerization comprises heating the powder to a temperature above the glass transition temperature, but below the onset of thermal decomposition temperature, and then pressing the powder into a PECA polymer. In an embodiment, the polymerization comprises heating the powder to a temperature of from about 110° C. to about 175° C. and then pressing the powder into a PECA polymer. In an embodiment, the recycling method can be repeated at least once, at least 2 times, at least 3 times, or at least 4 times.

Closed-Loop Recycling: Depolymerization to the Monomer and Repolymerization

Cured and/or annealed PECA plastics can be recycled by depolymerization to the ethyl cyanoacrylate monomer and then repolymerization according to any of the methods of forming a PECA plastic as described herein.

In an embodiment, a method for recycling PECA plastic comprises depolymerizing PECA plastic by combining a PECA plastic with a reagent and then heating the PECA plastic and reagent mixture. The combining may occur by any means as known in the art, for example in a mixer, by hand, by stirring, shaking, vibrating, and the like. The ethyl cyanoacrylate monomer is then extracted from the mixture. In an embodiment, the monomer is a different species containing the cyanoacrylate functional group. For example, the monomer may comprise methyl cyanoacrylate, n-butyl cyanoacrylate, octyl cyanoacrylate, or isobutyl cyanoacrylate.

In an embodiment, the reagent comprises hydroquinone, molecular sieves, sodium sulfate, magnesium sulfate, calcium carbonate, phosphorous pentoxide, or a combination thereof. In an embodiment, the reagent comprises phosphorous pentoxide. In an embodiment, the reagent is dried to remove moisture. In an embodiment, the reagent is dried by any means as known in the art, for example by flame drying, oven drying, and the like.

In an embodiment, the PECA material is dissolved in solvent and then precipitated into hexanes before combining with the reagent. In an embodiment, the solvent comprises acetone.

In an embodiment, the PECA and reagent mixture is heated to a temperature of about 180° C. to about 220° C. In an embodiment, the monomer is extracted by any means known in the art. In an embodiment, the monomer is extracted by distillation. As described herein, distillation of the monomer occurs by any distillation method as known in the art. In an embodiment, the yield of the monomer from depolymerization is at least about 75%, at least about 80%, at least about 85%, at least about 90%. In an embodiment, the monomer is then polymerized into a PECA plastic by any of the methods of producing a PECA plastic described herein.

In an embodiment, the depolymerization yields at least one byproduct in addition to the monomer. In an embodiment, the byproduct comprises nitrogen-substituted graphene precursor.

In an embodiment, the repolymerized PECA plastic material has substantially similar physical properties as the polymerized PECA plastic material as described herein. In an embodiment, the repolymerized PECA plastic material has substantially similar $M_n$, PDI, strength and elongation valued as the polymerized PECA plastic material as described herein.

In an embodiment, the depolymerization into a monomer and repolymerization of the monomer is repeated at least two times, at least three times, or at least four times.

In an embodiment, PECA plastics are depolymerized as a part of a waste stream. In an embodiment, the waste stream comprises PECA plastics and at least one other common plastic as known in the art. In an embodiment, the waste stream comprises at least one other contaminant as would be present in a common waste stream. In an embodiment, the other common plastics comprise common plastics as known in the art, including but not limited to acrylonitrile butadiene styrene (ABS), poly(propylene) (PP), poly(carbonate) (PC), poly(styrene) (PS), poly(ethylene terephthalate) (PET), low-density poly(ethylene) (LDPE), high-density poly(ethylene) (HDPE), poly(lactic acid) (PLA), poly(vinyl chloride) (PVC), and poly(methyl methacrylate) (PMMA). In an embodiment, the at least one other contaminant comprises paper, metals, food, adhesive, and other common components of a waste stream as known in the art.

In an embodiment, the depolymerization of PECA plastic as a part of a waste stream is according to any of the depolymerization methods described herein. In an embodiment, the depolymerization of the mixed waste stream results in an ethyl cyanoacrylate monomer recovery rate of at least about 50%, at least about 60%, at least about 70%, or at least about 75%. In an embodiment, the recycling method comprises a first step of sorting the plastics from at least a portion of the mixed waste stream. In an embodiment, the recycling method comprises a first step of sorting PECA plastics from at least a portion of the other common plastics prior to depolymerization. In an embodiment, the inclusion of a sorting step increases the yield of ethyl cyanoacrylate monomer.

EXAMPLES

Embodiments of the present disclosure are further defined in the following non-limiting Examples. It should be understood that these Examples, while indicating one or more preferred embodiments, are given by way of illustration only. From the above discussion and these Examples, one skilled in the art can ascertain the essential characteristics of the inventions, and without departing from the spirit and scope thereof, can make various changes and modifications of the embodiments of the inventions to adapt to various usages and conditions. Thus, various modifications of the embodiments, in addition to those shown and described herein, will be apparent to those skilled in the art from the foregoing description. Such modifications are also intended to fall within the scope of the appended claims.

For the Examples disclosed herein, the following methods and materials were used.

All polymerizations were carried out in polyethylene or polypropylene containers to prevent any premature polymerization of the ethyl cyanoacrylate monomer. Polymerizations occurred in a laboratory fume hood open to air under ambient environmental settings.

Ethyl cyanoacrylate (Starbond adhesives, >99%), DMSO (Fisher BioReagents, >99.7%), acetone (VWR, >99.5%), and P2O5 (Fisher, >95%) were used without further purification.

$^1$H NMR spectra were obtained on a Bruker Advance III 300 MHz with a broadband cryoprobe. Chemical shifts (δ) are expressed in parts per million (ppm) scale and are referenced to protons of the solvent CDCl3.

Gel Permeation Chromatography (GPC)—Molecular weight data was obtained using a Wyatt SEC-MALS system equipped with Dawn 8+ multi-angle laser light scattering detector and an Optilab T-REX refractive index detector and was analyzed using ASTRA software.

Differential Scanning Calorimetry (DSC)—Data was recorded on a TA Instruments Q2000 Modulated Differential Scanning Calorimeter using 5-10 mg samples. Samples were heated from 0° C. to 180° C. at a rate of 5° C./min with a modulation period of 60 s and a heating amplitude of ±1.6° C.

Uniaxial Tensile Elongation Tests—Tensile elongation tests were performed on a Labthink XLW (EC) instrument equipped with a 500N load cell and serrated grips. All samples were conditioned for 48 hours in an ambient environment and tests were performed in accordance with ASTM D638-14. For uniaxial tensile testing, micro tensile specimens were fabricated by scoring or cutting dog bone shape specimen from cured PECA sheets. Annealed samples were made by heating the cured sheets at 130° C. for 5 minutes, which allowed for the sample to be much more flexible and easier to cut. Sample dog bones were made with cross sectional dimensions of 29±1 mm×10±1 mm×2.5±0.1 mm and the tests were performed at a rate of 50 mm/min.

Uniaxial Compression Tests—Tensile elongation tests were performed on an Instron model 5984 Universal Testing Machine equipped with Bluehill Universal analysis software. All samples were conditioned in an ambient environment and tests were performed in accordance with ASTM D695-15. Compression samples were fabricated by curing the polymerization mixture in cylindrical polypropylene molds. After curing, the cylinders were heated at 130° C. for 5 min, which allowed for thermal annealing as well as flexibility to cut the edges to ASTM standard sizes.

X-Ray Diffraction (XRD)—Measurements were performed on a Rigaku Miniflex 600 at a rate of 10°/min and a step size of 0.02.

Infrared Spectroscopy (IR)—Data was recorded on a Nicolet iS20 FT-IR spectrometer equipped with an attenuated total reflectance (ATR) diamond plate. A background spectrum was recorded before each sample run and subtracted from the sample data. Samples were taken at 64 scans at a resolution of 4 cm-1 with a spacing of 0.482 cm-1.

Ultraviolet-visible Spectroscopy (UV-Vis)—Data was obtained on a Beckman Coulter DU 800 Spectrophotometer.

Example 1—Synthesis of PECA Polymers

The fundamental challenge with ethyl cyanoacrylate is its high reactivity, which leads to many initiation events, short polymers, and release of heat. A variety of dimethyl sulfoxide (DMSO) initiator conditions, outlined in Table 1, were screened with the goal of slowing down the polymerization reaction of ethyl cyanoacrylate, decreasing the number of initiation, and/or limit the quantity of heat generated during the reaction.

TABLE 1

DMSO Initiator Conditions

| Equivalents of DMSO | Polymerization time | Theoretical $M_n$ (kDa) | Actual $M_n$ (kDa) | PDI |
| --- | --- | --- | --- | --- |
| .1 | 12 h | 125.1 | 101.3 | 1.28 |
| .05 | 24 h | 250.1 | 316.3 | 1.07 |
| .025 | 48 h | 500.4 | 1,300 | 1.09 |
| .01 | >48 h | 1,251 | 1,624 | 1.02 |
| .005 | >48 h | 2,502 | 1,877 | 1.05 |

DMSO and acetone were stirred in a polypropylene beaker. Ethyl cyanoacrylate monomer was then rapidly added to the stirring mixture and allowed to continue to stir until an initial increase in viscosity was observed. At this point, the viscous solution was poured into a mold and the solution was allowed to cure for a minimum of 24 hours. As a control, ethyl cyanoacrylate was left stirring in acetone.

Figure 3:
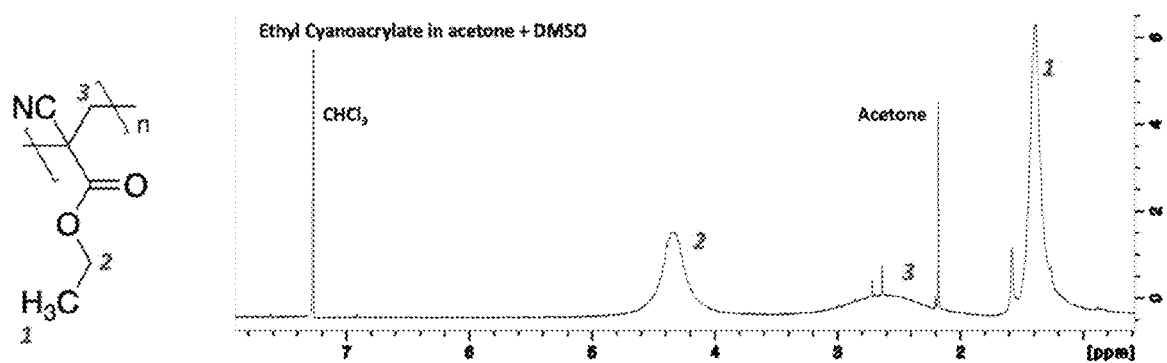
FIG. 3 shows NMR spectra of ethyl cyanoacrylate in acetone with DMSO initiator that produced PECA polymer after 48 hours.
Figure 4:
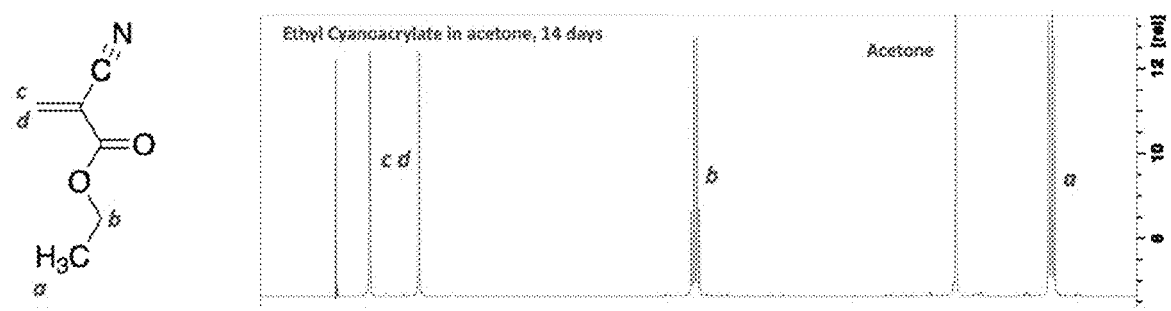
FIG. 4 shows NMR spectra of ethyl cyanoacrylate in acetone after 14 days.

One successful embodiment comprised 25 M monomer in acetone, with initiation occurring at 23° C., open to the air, and by addition of sub-stoichiometric quantities of DMSO. Under these conditions, polymerization proceeded for 24 hours as the reaction mixture hardened to a transparent solid. $^1$H NMR analysis of the solid polymer revealed 1% of residual monomer and clean conversion to polymer as shown in FIG. 3, where the solid polymer is used directly as cast. After 14 days, the control ethyl cyanoacrylate had not polymerized as confirmed by the $^1$H NMR analysis shown in FIG. 4.

In the absence of added DMSO, ethyl cyanoacrylate did not polymerize, even after 14 days. Thus, DMSO served a critical role as initiator in the polymerization reaction.

By the end of the polymerization process, little acetone or DMSO is present. 47 mL of ethyl cyanoacrylate monomer was added to a pre-stirred solution of 15 mL acetone and 1.4 mL MDSO in a polypropylene beaker. The solution was allowed to stir until viscous and then poured into a polypropylene mold to produce an approximately 2 mm thick sheet of cured plastic. Within 24 hours, the sample had cured to a glossy, rigid sheet. Relative ratios of polymer to monomer were obtained by $^1$H NMR spectra to assess the extent of the reaction. Conversion as a function of time is reported in Table 2. To remove residual solvents, the solid plastic product was conditioned at room temperature, open to the air. For example, only about 5 wt-% of acetone and DMSO remained in the polymerized samples after polymerizing a 50 g batch of monomer for 24 hours, and no acetone was detectable by $^1$H NMR after 48 hours.

TABLE 2

| | Time for Curing | | | | |
|---|---|---|---|---|---|
| | 24 h | 48 h | 72 h | 96 h | 240 h |
| Conversion to Polymer | 79.9% | 85.4% | 86.5% | 89.3% | >99% |

0.05 equivalent of DMSO relative to 30 g of monomer yielded a polymer with a $M_n$ value of 318+/−43 kDa and an average polydispersity index (PDI) of 1.024+/1 0.014. A predicted polymer length to achieve polymer entanglement is a $M_n$ value of about 29.5 kDA, which can be easily achieved with the polymerization conditions described herein. In another embodiment, decreasing the DMSO to 0.0025 equivalent relative to monomer resulted in a polymer with an $M_n$ value to 1,877 kDa, and a PDI value of 1.048.

Advantageously, heat flow in the polymerization reaction is low. 30 g of ethyl cyanoacrylate (25 M in acetone) was polymerized by the addition of 0.05 equivalents of DMSO at 23° C. In another sample, 0.0003 equivalents of commercial N,N-dimethyl-p-toluidine was added instead of DMSO. The temperature of the reactions mixtures were measured using an infrared thermometer. The temperature of the reaction mixture using DMSO rose only about 3.5° C. during the polymerization reaction for a 30 g batch monomer. In contrast, N,N-dimethyl-p-toluidine leads to an exothermic and less controllable polymerization reaction.

Example 2—Thermal Annealing

Figure 5:
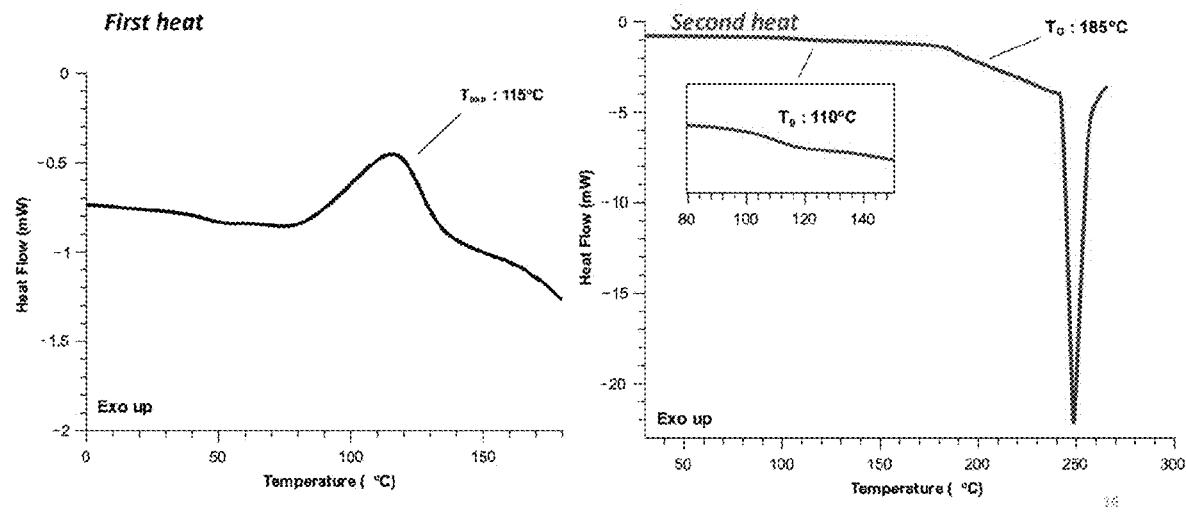
FIG. 5 shows a DSC thermogram of the cured PECA plastic upon first heating to 180 degrees C. (on the left) and a DSC thermogram of the PECA plastic after cooling and reheating until decomposition is reached (on the right).

PECA samples were processed as described in Example 1. DSC was used to characterize the thermal behavior of the PECA plastics. A sample was first heated to 180° C. DSC analysis of the PECA sample reveal an exothermic peak at approximately 115° C. as shown in FIG. 5 on the left. The sample was then cooled to 0° C. and heated a second time to decomposition for DSC analysis. As shown in FIG. 5 on the right, the exothermic peak disappeared. Without being limited to a particular theory, this exothermic peak corresponded to release of stress in the polymer matrix during thermal annealing; a reduction of voids between polymer chains that exist in the as-polymerized polymer matrix. The introduction of heat allows for an increase in the uniformity of the material in a process called thermal annealing. A DSC thermogram of the second heating cycle shows a resolved glass transition temperature ($T_g$) at approximately 100° C., an endothermic transition at 180° C. that is attributed to a reversible depolymerization-repolymerization process, and a sharp onset of degradation ($T_o$) at approximately 240° C., as shown in FIG. 5 on the right. Modulated DSC was used to confirm these transitions, the Tg corresponding to a step transition in the reversing signal, and reversible depolymerization-repolymerization and decomposition appearing in the non-reversing signal.

Figure 6:
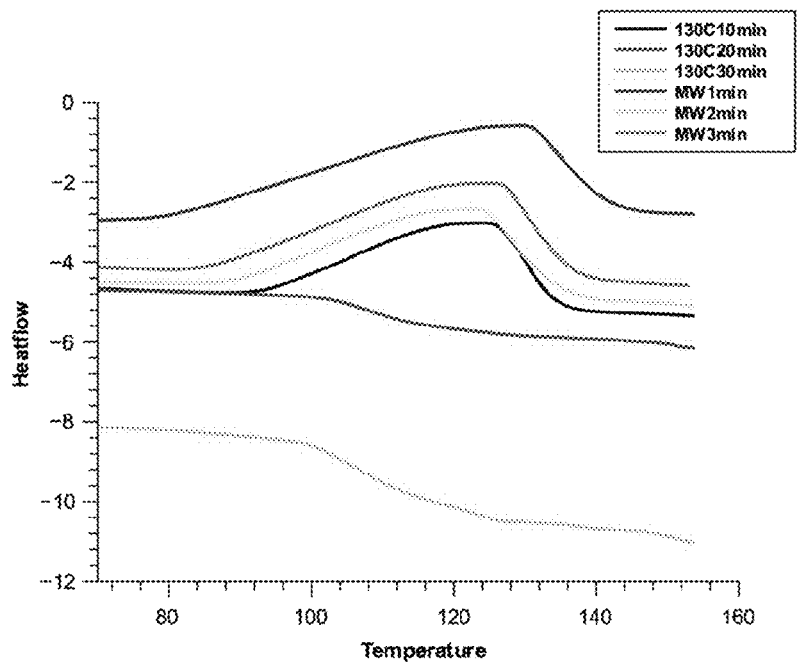
FIG. 6 shows DSC thermograms of PECA plastics with varying thermal anneal conditions.
Figure 7:
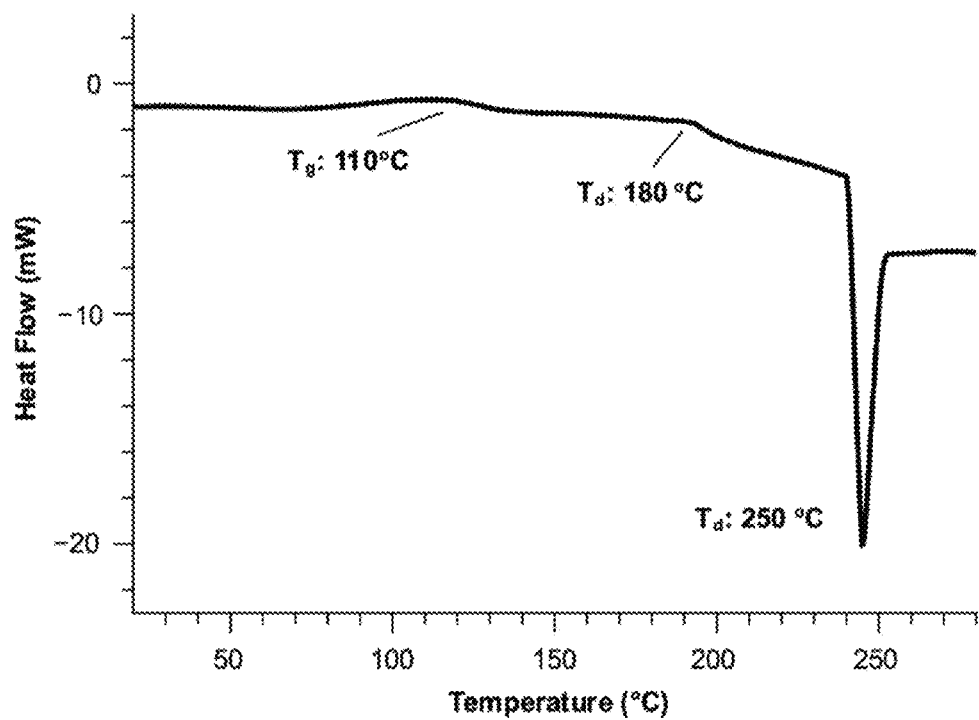
FIG. 7 shows a DSC thermogram of bulk annealed PECA plastic.

To confirm the results of a thermal anneal step, sheets of PECA were warmed in the oven at 130° C. for 5 min to allow for dog bone specimen to be cut. The ~2 g dog bone samples were then thermally annealed in the oven at 130° C. for 5, 10, 20, and 30 min, and characterized via DSC and uniaxial tensile testing. Additional experiments tracked annealing potential by microwaving the dog bone samples in a conventional microwave for durations of 60, 120, and 180 s. A minimum of 5 samples were evaluated for each annealing condition. The DSC thermograms shown in FIG. 6 indicate that complete annealing was achieved in the samples that were annealed at 130° C. for 20 and 30 min, as the exothermic transition indicative of stress relaxation was replaced by a $T_g$ around 110° C. The thermograms also indicated that the decomposition behavior of the bulk thermally annealed objects was consistent with thermogram obtained in the heat-cool-heat DSC experiment described in the above paragraph. This is evident by comparison of the thermogram of bulk annealed PECA in FIG. 7 to the thermogram in FIG. 5 on the right.

Figure 8:
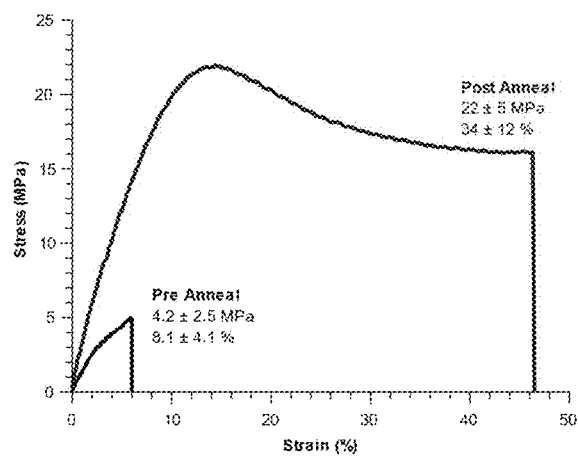
FIG. 8 is a stress-strain curve comparing PECA plastic before and after annealing.

The anneal temperature of 130° C. was chosen because it is above the exothermic transition at about 115° C., but below the onset of thermal decomposition. The duration of the heating depends on the dimensions of the plastic with the maximum achievable values for ultimate tensile strength and elongation at break reaching 22+/−5 MPa and 34+/−12%, respectively, within a batch of polymer with $M_n$ value to 362 kDa, and a PDI value of 1.026. As shown in the stress-strain curve of FIG. 8, the strength of some PECA plastic material can be improved by an anneal step.

Over five batches of the polymer annealed at 130° C., the stress and strain values averaged 22+/−1 MPa and 17+/−14%. These stress and strain values are similar to the values for poly(styrene) and represent a five-fold increase in strength and a four-fold increase in durability for the PECA plastic.

Figure 9:
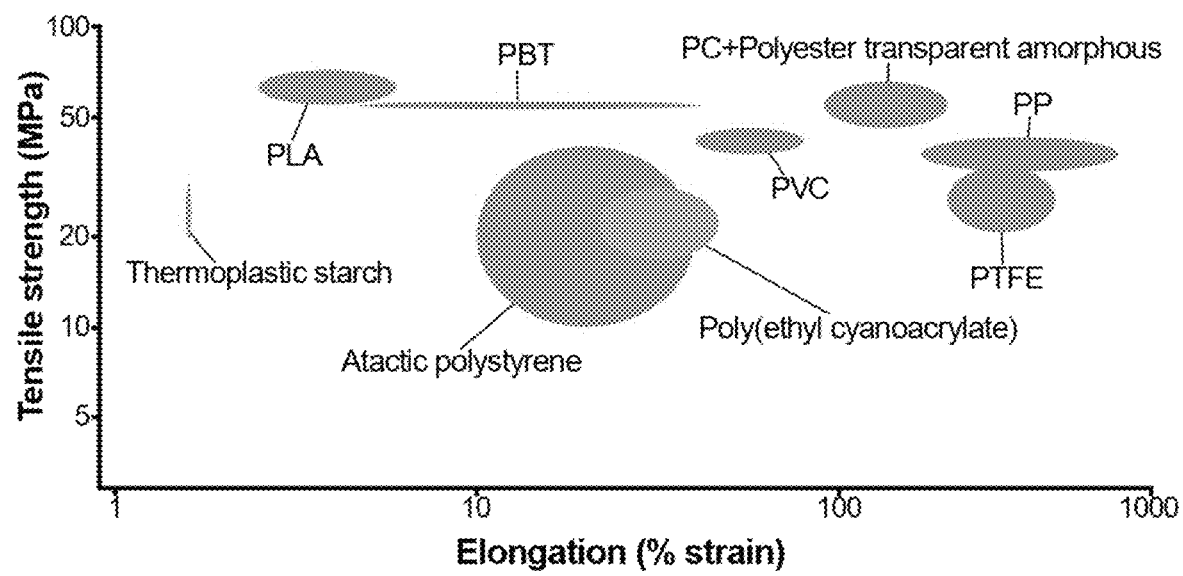
FIG. 9 is an Ashby plot of tensile strength versus elongation.
Figure 10:
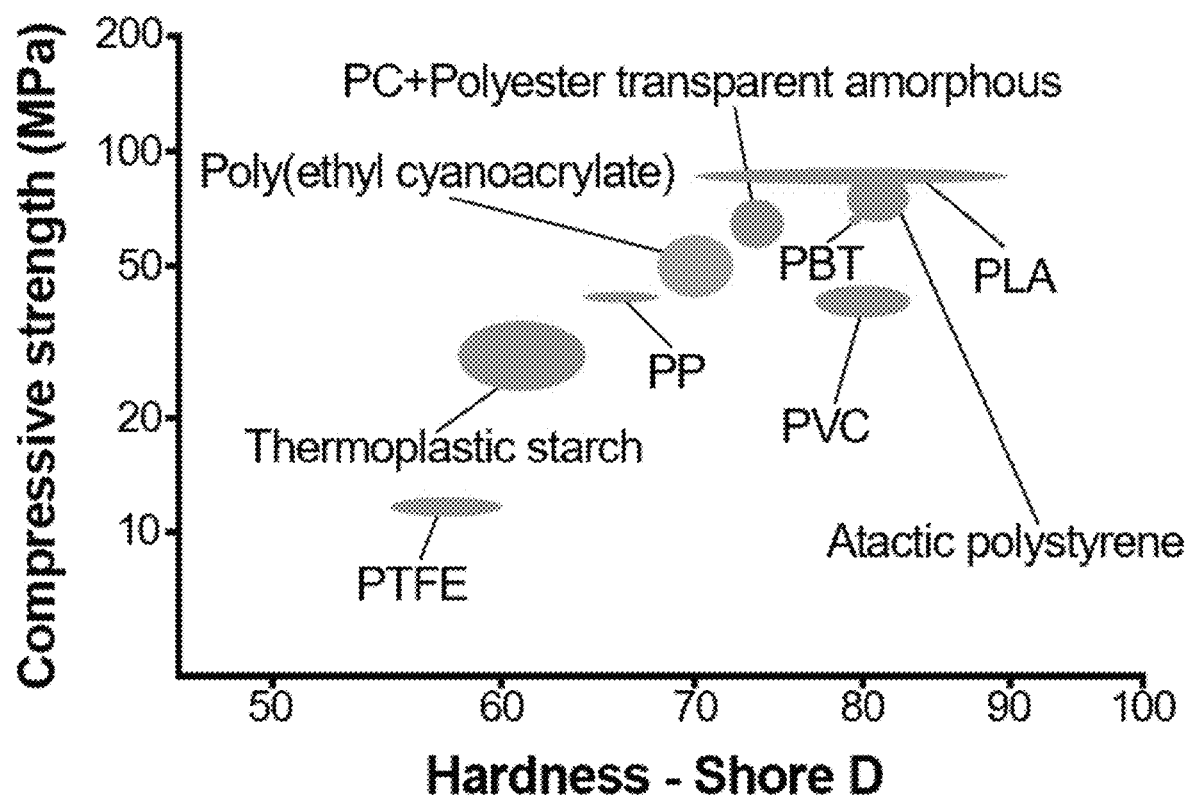
FIG. 10 is an Ashby plot of compressive strength versus hardness.

An Ashby plot of tensile strength versus elongation is shown in FIG. 9 and of compressive strength versus hardness is shown in FIG. 10. Annealed PECA plastics comprise values in line with known, commonly used plastics.

The density of the PECA plastic ($\rho=1.10\pm0.04$ g/mL) is approximately half-way between poly(acrylonitrile butadiene styrene) (ABS) and poly(methyl methacrylate) (PMMA), while the hardness (Shore D hardness of 70±2) is similar to atactic poly(styrene). A table of physical characteristics of PECA plastic as compares to atactic poly(styrene) is summarized in Table 3.

TABLE 3

| | Poly(ethyl cyanoacrylate) plastic | Atactic Polystyrene |
|---|---|---|
| $T_g$ (° C.) | 110° C. | 90-95° C. |
| Tensile strength (MPa) | 22 ± 5 | 17-50 |
| Elongation at break (%) | 34 ± 12 | 1-40 |
| Young's Modulus (GPa) | 0.30 ± .09 | 1.6-3.4 |
| Average molecular weight (kg/mol) | 318 ± 43 | 100-400 |
| Density(g/mL) | 1.1 ± 0.04 | 1.0-2.0 |
| Hardness (Shore D) | 70 ± 3 | 70-90 |

Figure 11:
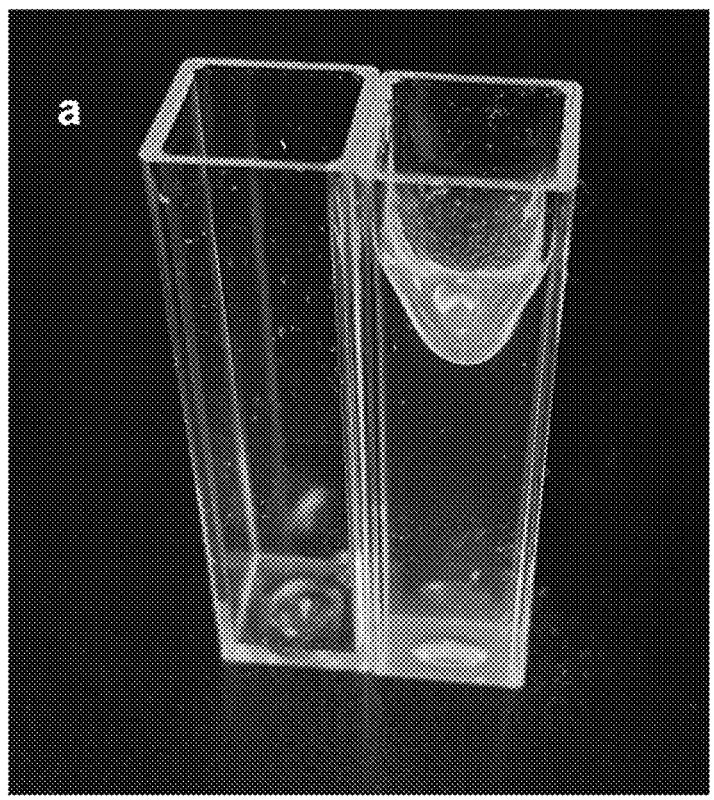
FIG. 11 is a photograph of plastic cuvettes, one empty and one containing polymerized and annealed PECA.
Figure 12:
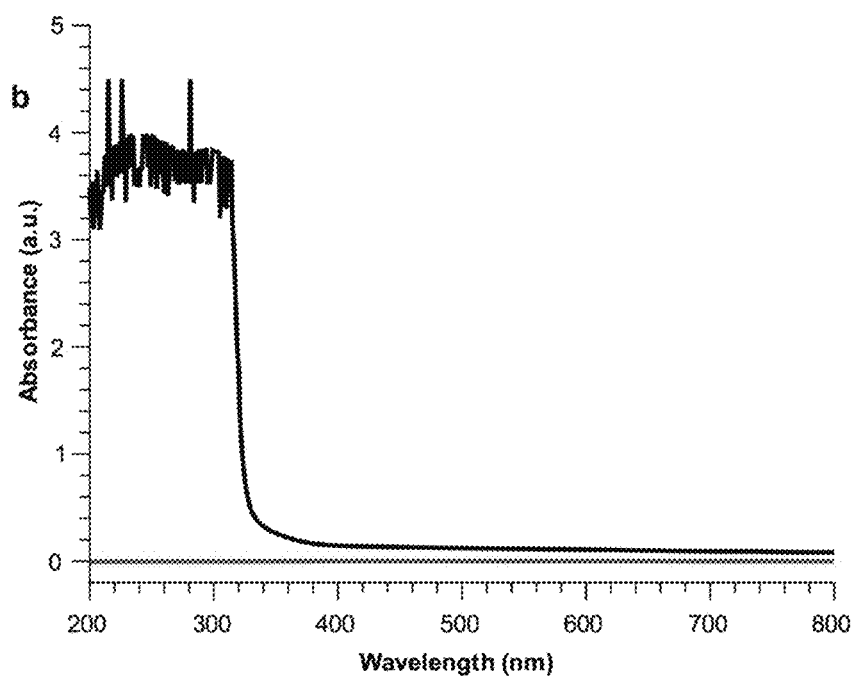
FIG. 12 shows a UV-Vis spectrum of pure PECA compared to a control.

The poly(ethyl cyanoacrylate) plastics are transparent, absorbing ≥10% of light at wavelengths below 325 nm, with 90-100% transmittance of wavelengths of light above 350 nm. A PECA plastic sample was polymerized and annealed in a plastic cuvette as shown in FIG. 11. An empty cuvette was used as a control. The cured PECA sample was analyzed on the UV-Vis spectrophotometer from 800 to 200 nm at a rate of 1200 nm/min. FIG. 12 shows the UV-Vis spectrum of pure PECA plastic (in black) compared to the control (in red).

Figure 13:
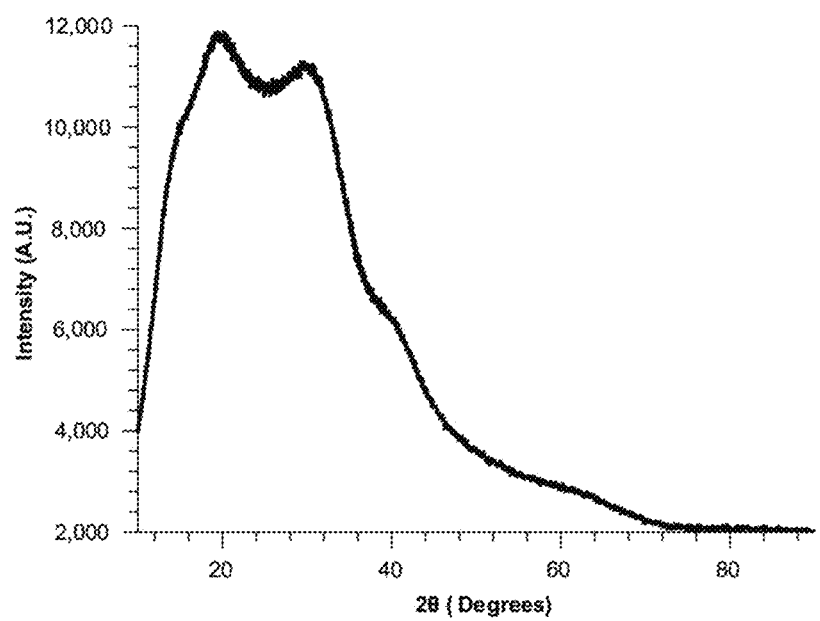
FIG. 13 shows the XRD patter for PECA plastic.

Transparent plastics typically have amorphous poly morphology, which is the case for these PECA plastics, as confirmed by x-ray diffraction (XRD) measurements. The XRD pattern for PECA plastic is shown in FIG. 13 and confirms the amorphous structure of the PECA polymer chains.

Figure 19:
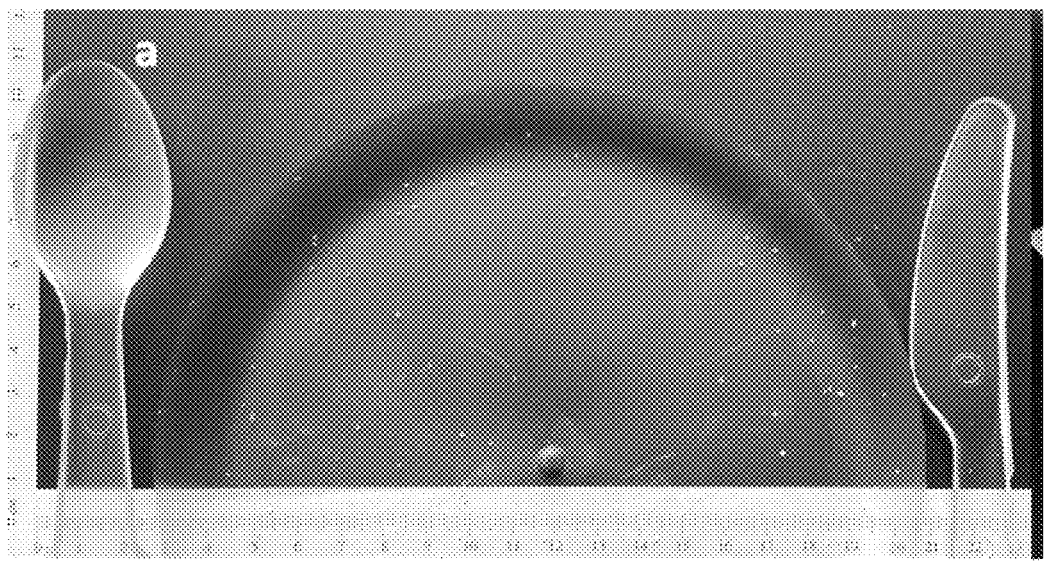
FIG. 19 is a photograph of a PECA plastic knife and spoon.

An as-cast PECA plastic knife and spoon were formed in molds and annealed in an oven at 130° C. for 5 minutes. A photograph of the knife and spoon are shown in FIG. 19.

Example 3—Thermoforming Shaped Products

Figure 20:
FIG. 20 is a photograph of a thermoformed PECA bowl.

The thermal and mechanical properties of PECA plastics are appropriate and convenient for thermoforming shaped products, offering an alternative method to direct molding of objects during the polymerization reaction. In this example, a 2 mm thick sheet of as-cast PECA was heated to 130° C. until soft, then pressed over a bowl to create a bowl with ruffled edges. A photograph of a thermoformed bowl is shown in FIG. 20.

Water was stored in the bowl at 23° C. for days without noticeable changes in the physical or mechanical properties of the bowl.

Figure 14:
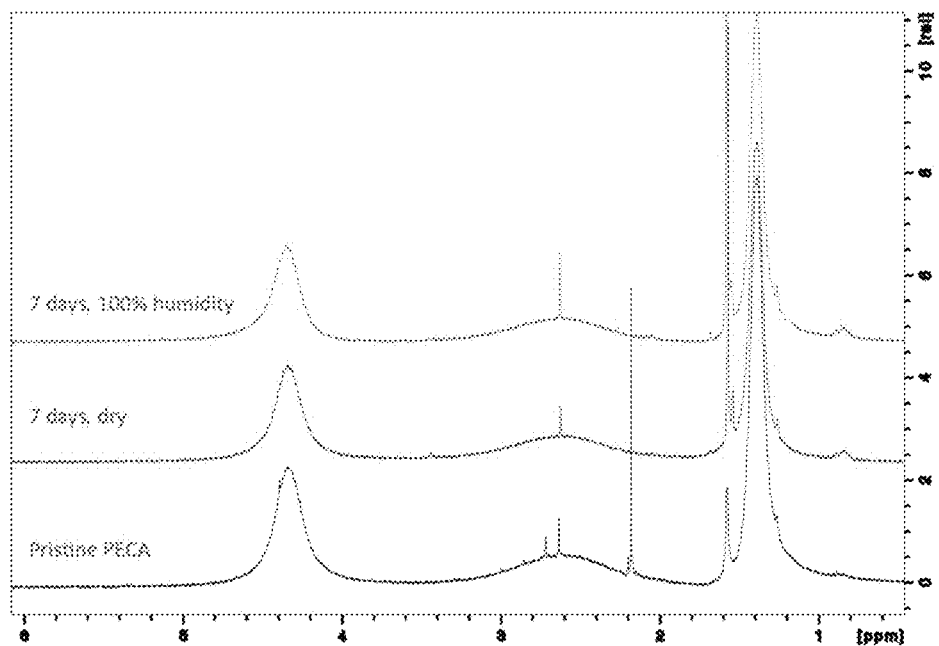
FIG. 14 shows the NMR spectra of PECA processed under various conditions.

Example 4—Stability of PECA Materials 0.1 g of PECA material was placed into 2 vials. The first vial was placed in an oven and opened to air while the other placed in a beaker containing water that was then capped to produce a humid environment. The two vials were kept in the oven at 60° C. for 7 days and then evaluated by $^1$H NMR and GPC. FIG. 14 shows the NMR spectra of pristine PECA (in black), PECA after 7 days at 60° C. (in blue), and PECA after 7 days at 60° C. in 100% humid environment (in green). GPC chromatograms and $^1$H NMR spectra reveal no changes or new peaks when PECA plastics are heated at 60° C. for 7 days in 100% humidity.

Example 4-Mechanical Recycling

Cured resins of PECA were ground in a 300 g CGoldenwall Electric Grain Mill Grinder for 5 minutes until a fine powder was obtained. The fine powder was then filtered through a metal mesh strainer to ensure larger chunks were removed. 10 g of powder was then measured out into a 10 cm×10 cm aluminum mold that was then preheated in the oven at 130° C. for 5 min. The preheated mold and powder was then put in a Carver Model 4386 benchtop hydraulic heat press with electronic heated platens preheated to 130° C. The mold and powder was then pressed at 2 metric tons for 15 minutes. The mold was then removed and allowed to cool to room temperature before a solid plastic sheet was removed. The recycled sample was then characterized by GPC to obtain molecular weight and polydispersity data. The resulting plastic sheet was then reground into a powder, and the process was repeated for a total of 4 recycling iterations. The experiment was repeated 3 times to ensure the reproducibility of the process and obtain an average molecular weight at each step.

Figure 21:
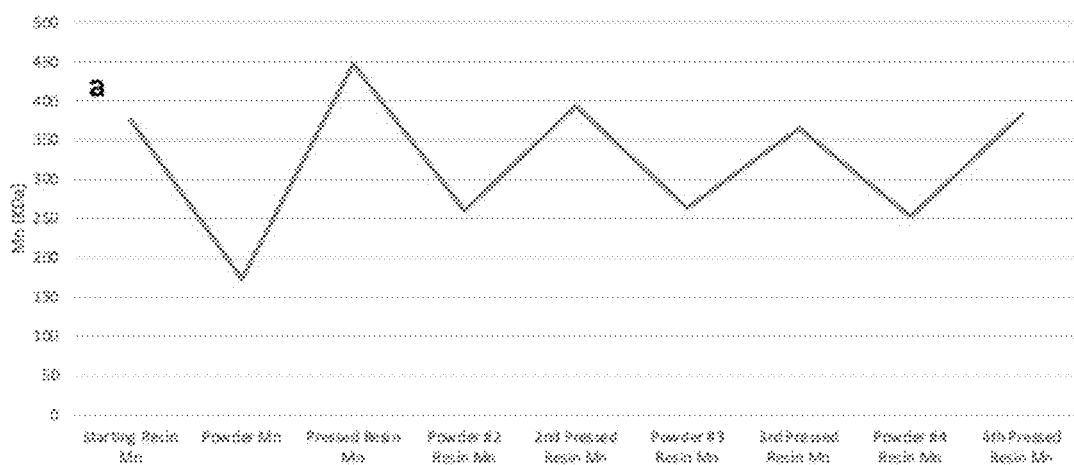
FIG. 21 is a plot of average molecular weight over the recycling processes.
Figure 22:
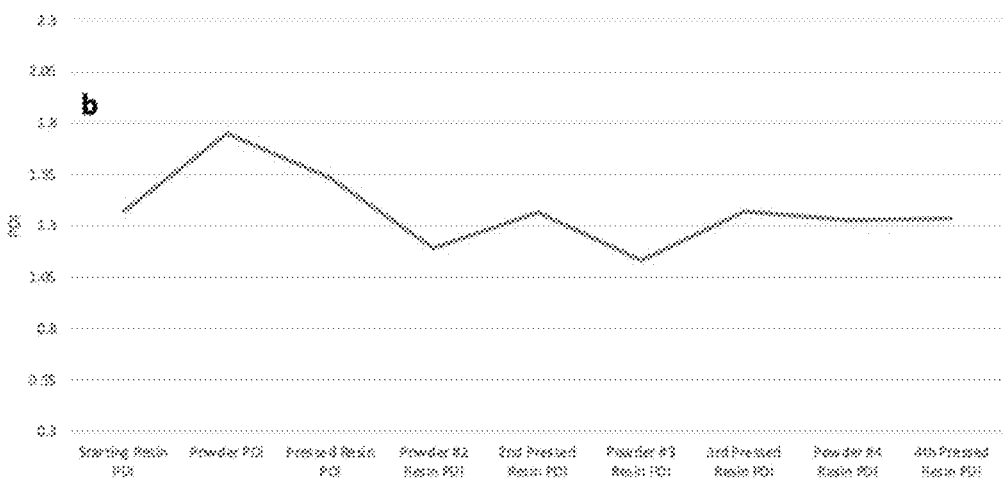
FIG. 22 is a plot of PDI over the recycling processes.

FIG. 21 shows the change in average molecular weight over the recycling processes. As shown in FIG. 21, the length of the polymer decreases upon grinding, but increases again upon heat pressing. This is consistent with depolymerization caused by mechanical forces, followed by repolymerization of the monomers. FIG. 22 shows the change in PDI over the recycling processes. As shown in FIG. 22, recycled PECA polymers reach an equilibrium length that displays a consistent PDI value.

Figure 18:
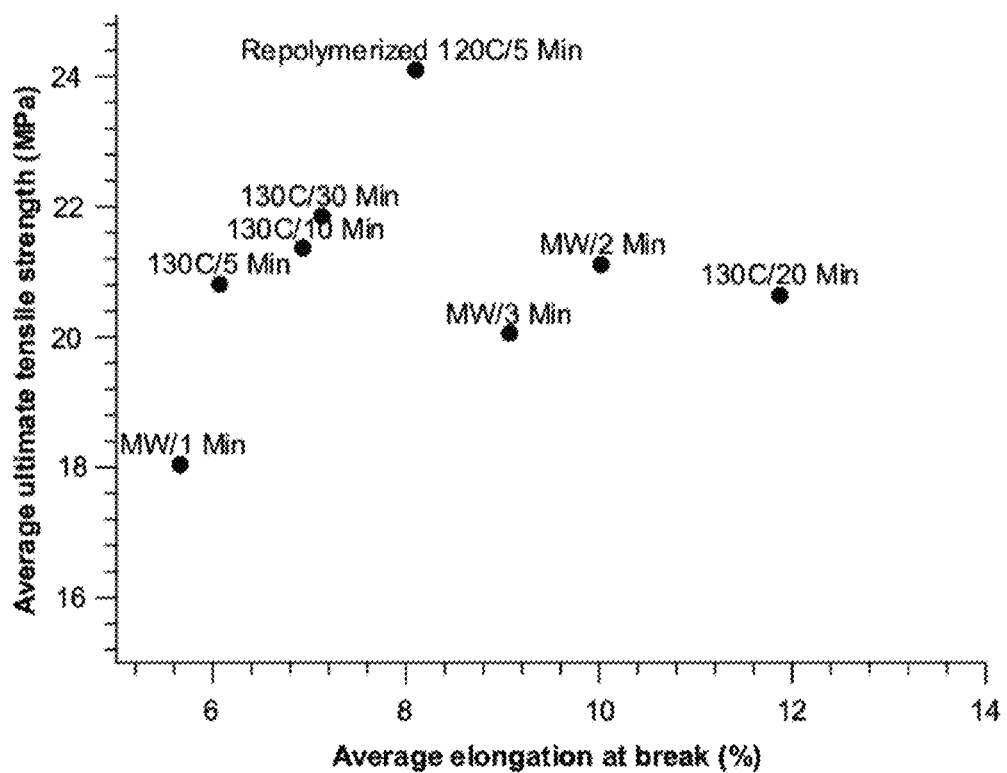
FIG. 18 is a plot of ultimate tensile strength with respect to elongation at break for annealed PECA plastic samples.

FIG. 18 is a plot of ultimate tensile strength with respect to elongation at break of annealed PECA plastic samples, including a PECA plastic made from repolymerized monomer. As shown in FIG. 18, when repolymerized, the sample annealed for 5 minutes was superior to samples annealed for 5 minutes made from pristine monomer.

Example 5—Depolymerization and Repolymerization 2 g of phosphorous pentoxide ($P_2O_5$) was added into two 250 mL round bottom flasks that were then attached to a water condenser and flame dried under vacuum 3 times and purged with argon to remove as much moisture as possible. For optimal results, any residual DMSO was removed from the PECA sheets by dissolving them in acetone and precipitating into hexanes. At this point, the resulting white powder was pressed into films. 40 g of PECA films were added to the dry distillation flask and a magnetic stir bar was added. A vacuum was pulled on the system and the distillation flask was then heated in a silicon oil bath. Ethyl cyanoacrylate monomer began to distill over when the temperature of the silicone oil bath read 210° C. into the receiving flask which was cooled in an ice water bath. The distillation was allowed to run for a total time of 122 minutes, at which point 37 g of pure ethyl cyanoacrylate was recovered.

Figure 15:
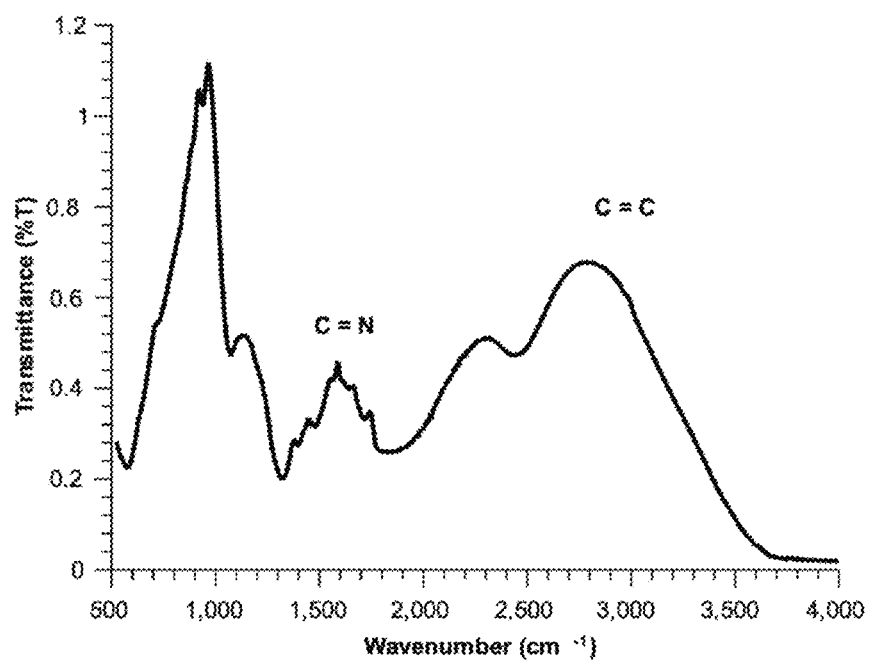
FIG. 15 is a plot of infrared spectroscopy for a recovered recycling byproduct.
Figure 16:
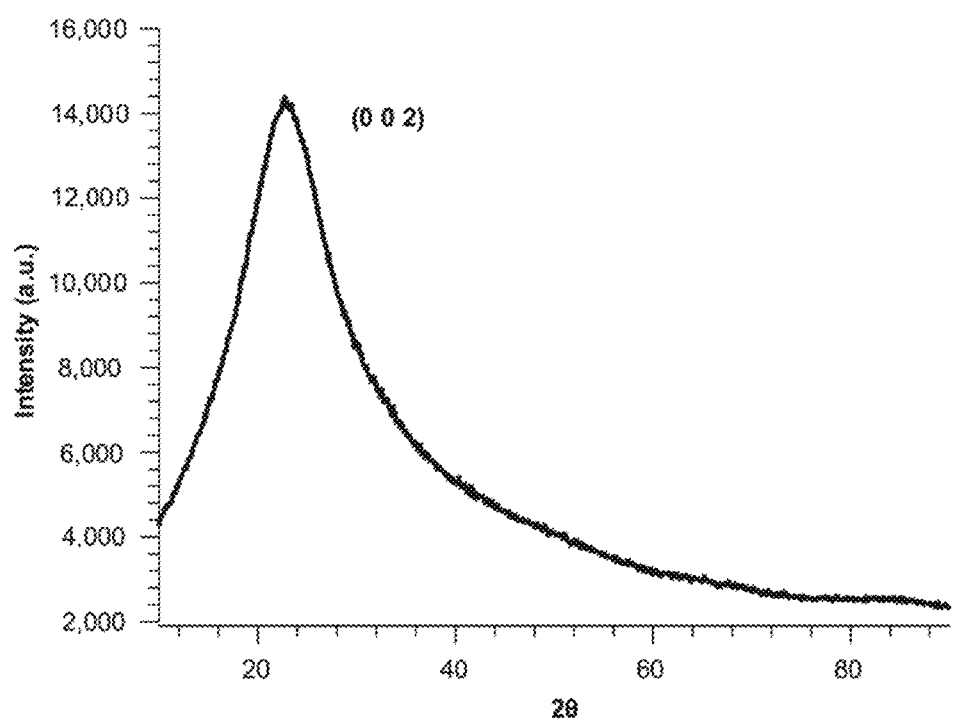
FIG. 16 is a plot of XRD measurements of a recovered recycling byproduct.

This process of depolymerizing solid plastic into monomer provided clean monomer with a 93% yield, along with a small quantity of black material remaining in the distillation flask. FIG. 15 is a plot of infrared (IR) spectroscopy for this material and revealed the presence of nitrogen-carbon double bonds, rather than the triple bonds of PECA. FIG. 16 plots XRD measurements of this black material which shows a broadened peak corresponding to a (0 0 2) plane. The IR spectroscopy and XRD measurements are consistent with a nitrogen-substituted graphene precursor.

20 mL of the recovered ethyl cyanoacrylate monomer was added to a pre-stirred mixture of 0.6 mL DMSO in 0.7 mL acetone. At the same time, 20 mL of pristine, store-bought ethyl cyanoacrylate was also added to a pre-stirred mixture of 0.6 mL DMSO in 0.7 mL acetone. Both mixtures were poured into a mold and allowed to cure for approximately 24 hours before being cut into dog bone tensile test specimen and thermally annealing at 130° C. for 5 minutes. The samples were tensile tested 48 hours later.

Figure 17:
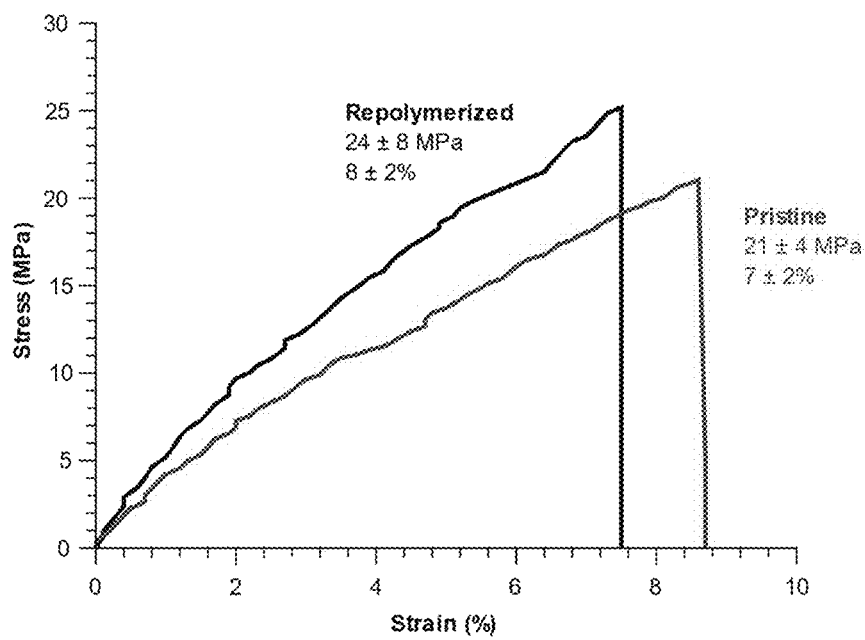
FIG. 17 is a plot of a stress-strain curve for PECA plastic polymerized from pristine, store-bought monomer and from monomer recovered via depolymerization.

Repolymerization of the monomer collected in the Teflon flask resulted in polymers with target lengths that provide ultimate tensile strength and percent elongation values that are nearly identical to similar-length polymers prepared from commercial monomer. FIG. 17 is a plot of a stress-strain curve for PECA plastic polymerized from pristine, store-bought monomer (in purple) and from monomer recovered via depolymerization (in black), showing similar results between the two PECA plastics.

Example 5—Depolymerization of PECA Plastic in Mixed Plastic Waste 6.8 g of solid pieces of PECA plastic was combined with a shredded mixture of unwashed, municipal plastic waste that was obtained from the City of Boise waste collection program. The composition of the municipal plastic waste is shown in Table 4 and included acrylonitrile butadiene styrene (ABS), poly(propylene) (PP), poly(carbonate) (PC), poly(styrene) (PS), poly(ethylene terephthalate) (PET), low-density poly(ethylene) (LDPE), high-density poly(ethylene) (HDPE), poly(lactic acid) (PLA), poly(vinyl chloride) (PVC), and poly(methyl methacrylate) (PMMA). Less dense plastic materials (PET films, polystyrene foam, and PVC films) were represented in lower weight amounts as they physically took up more space than other representative plastic materials.

TABLE 4

| Plastic | PP | HDPE | LDPE | PET | PC | PS foam | PVC | PMMA | PLA | ABS |
|---|---|---|---|---|---|---|---|---|---|---|
| Representative amounts (mg) | 520 | 520 | 530 | 100 | 490 | 100 | 150 | 710 | 510 | 520 |

The PECA and plastic mixture was added to a 150 mL round bottom flask containing $P_2O_5$ that had already been flame dried 3× under vacuum. The flask was then attached to a distillation apparatus that had also been flame dried 3× under vacuum and contained $P_2O_5$ in the receiving flask. A vacuum was pulled on the system and the distillation flask was then heated in a silicon oil bath. Ethyl cyanoacrylate monomer began to distill over when the temperature of the silicone oil bath read 210° C. into the receiving flask which was cooled in an ice water bath. The distillation was allowed to run for a total time of 120 minutes, at which point 6.28 g pure ethyl cyanoacrylate was recovered.

A typical unwashed plastic waste stream contains other plastics and a variety of contaminants, including paper, aluminum, food residue, adhesives, and number of other components. Closed-loop recycling of solid PECA plastic is possible from this type of crude waste stream. The recovery rate of the distilled ethyl cyanoacrylate monomer collected from this broad mixture was 75%. If the plastic waste stream is cleaned to remove non-plastic components, then monomer recovery increases back to the 90's, even in cases in which PECA plastic is mixed with the specific composition of which is summarized in Table 3.

Example 6—Batch Depolymerization of PECA by Continuous Distillation 2.5 g of PECA was added to a round bottom flask containing 0.4 g $P_2O_5$ that had been flame dried 3 times under vacuum. The flask was then attached to a distillation apparatus that had also been flame dried 3 times under vacuum and contained $P_2O_5$ in the receiving flask. A vacuum was pulled on the system and the distillation flask was then heated in a silicone oil bath. Ethyl cyanoacrylate monomer began distilling when the temperature of the silicone oil reached 200° C. The receiving flask was cooled to 0° C. Complete distillation occurred over 90 minutes, at which point 2.0 g of pure ethyl cyanoacrylate was recovered, for a yield of 80%. Using the same glassware as the first depolymerization, 2.35 g of PECA plastic was added to the original round bottom flask that contained visible byproduct. Additional $P_2O_5$ was mixed into the round bottom flask, and the flask was attached to the original distillation apparatus. The same conditions as the first depolymerization were used to recover 1.76 g of pure ethyl cyanoacrylate for a yield of 75%. Once again using the same glassware used in the first and second depolymerization, 1.42 g of PECA plastic and more $P_2O_5$ were added to the original round bottom flask that contained visible byproduct. The same conditions as the first and second depolymerization were used to recover 1.31 g of pure ethyl cyanoacrylate for a yield of 92%.

Example 7—Determining Annealing Parameters 50 g sheets of cured PECA were warmed in an oven at 130° C. for 5 minutes to soften for cutting dog bones. 2 g dog bone samples were then thermally annealed in the oven at 130° C. for an additional 5, 10, 15, 20 30, 45, and 60 minutes and characterized by uniaxial tensile testing. A minimum of 5 samples were evaluated for each annealing condition including 0 min sample that were fabricated by warming at 130° C. for 5 minutes to facilitate cutting of dog bones, but otherwise underwent no additional annealing. GPC traces show the appearance of peaks at longer retention times indicates growth of shorter polymers at longer annealing times which result in a decrease in mechanical performance. The differential refractive index (RIU) values were normalized due to different amounts of sample injected.

Compression samples were fabricated by curing the polymerization mixture in cylindrical polypropylene molds. After curing, all samples were heated at 130° C. for 5 minutes to ensure enough flexibility to cut the samples down to heights of 25.4±1 mm and diameters of 12.7±0.5 mm, per ASTM standards. Annealed cylinders were heated at 130° C. for an additional 30 min, while un-annealed samples were not heated. A minimum of five samples were compression tested to obtain an average compressive strength value.

The present disclosure is further defined by the following numbered embodiments.

1. A method for preparing a poly(ethyl cyanoacrylate) plastic comprising polymerizing an ethyl cyanoacrylate monomer by combining the ethyl cyanoacrylate monomer with an initiator to form a poly(ethyl cyanoacrylate), and curing the poly(ethyl cyanoacrylate) to form a plastic.

2. The method of embodiment 1, wherein the initiator comprises a tertiary amine, a phosphine, an amine, an amine oxide, a betaine, a sulfoxide, or combinations thereof.

3. The method of any one of embodiments 1-2, wherein the initiator comprises dimethylformamide, trimethyl amine N-oxide, trimethylglycine, or dimethyl sulfoxide, or a combination thereof.

4. The method of any one of embodiments 1-3, wherein the initiator comprises dimethyl sulfoxide.

5. The method of any one of embodiments 1-4, wherein the polymerizing occurs at ambient temperature.

6. The method of any one of embodiments 1-5, wherein the polymerizing occurs at a temperature below ambient.

7. The method of any one of embodiments 1-6, wherein the curing occurs at ambient temperature.

8. The method of any one of embodiments 1-6, wherein the curing occurs at a temperature above ambient.

9. The method of any one of embodiments 1-8, wherein the polymerizing occurs in a vessel comprising poly polyethylene or polypropylene.

10. The method of any one of embodiments 1-9, wherein the curing occurs in a vessel comprising poly(ethylene) or poly(propylene).

11. The method of any one of embodiments 1-10, wherein the ethyl cyanoacrylate is combined with sub-stoichiometric quantities of the initiator.

12. The method of any one of embodiments 1-11, wherein the polymerization takes at least about 1 hour, at least about 6 hours, at least about 12 hours, at least about 24 hours, or at least about 48 hours.

13. The method of any one of embodiments 1-12, wherein the curing takes about 24 hours, or at least about 24 hours.

14. The method of any one of embodiments 1-13, wherein the method further comprises annealing the poly(ethyl cyanoacrylate).

15. The method of embodiment 14, wherein the annealing occurs at a temperature of from about 120° C. to about 150° C.

16. The method of any one of embodiments 14-15, wherein the annealing occurs at a temperature of about 130° C.

17. The method of any one of embodiments 14-16, wherein the annealing takes from about 1 minute to about 60 minutes.

18. The method of any one of embodiments 14-17, wherein the annealing takes from about 10 minutes to about 30 minutes.

19. The method of any one of embodiments 14-18, wherein the poly(ethyl cyanoacrylate) plastic comprises a tensile strength of from about 15 MPa to about 30 MPa.

20. The method of any one of embodiments 14-19, wherein the poly(ethyl cyanoacrylate) plastic comprises an elongation at break percentage of from about 20% to about 50%.

21. The method of any one of embodiments 14-20, wherein the poly(ethyl cyanoacrylate) plastic comprises a density of from about 1 g/mL to about 2 g/mL.

22. The method of any one of embodiments 14-21, wherein the poly(ethyl cyanoacrylate) plastic comprises a Hardness Shore D value of from about 60 to about 80.

23. The method of any one of embodiments 1-22, wherein the poly(ethyl cyanoacrylate) plastic comprises an average molecular weight of from about 50 kDa to about 5,000 kDa.

24. The method of any one of embodiments 1-23, wherein the poly(ethyl cyanoacrylate) plastic comprises an average polydispersity index of about 1.0 to about 1.4.

25. The method of any one of embodiments 1-24, wherein the method further comprises thermoforming the poly(ethyl cyanoacrylate) plastic into an article or product.

26. The method of any one of embodiments 1-24, wherein the curing occurs in a mold to prepare a product or article comprising the poly(ethyl cyanoacrylate) plastic.

27. The method of any one of embodiments 1-26, wherein the polymerization further comprises an additional component comprising a dye, a pigment, a fragrance, a solvent, a carrier, a thickener, a solidifying agent, a clarifying agent, a decoration, or mixtures thereof.

28. A plastic material comprising the poly(ethyl cyanoacrylate) plastic prepared by the method of any one of embodiments 1-27.

29. An article or product comprising the poly(ethyl cyanoacrylate) plastic prepared by the method of any one of embodiments 1-27.

30. A method for recycling the poly(ethyl cyanoacrylate) plastic of any one of embodiments 1-29 comprising mechanical depolymerizing the poly(ethyl cyanoacrylate) plastic via mechanical forces, and repolymerizing poly(ethyl cyanoacrylate) plastic by heat pressing.

31. The method of embodiment 30, wherein the mechanical forces comprise grinding or milling the poly(ethyl cyanoacrylate) plastic into a powder.

32. The method of any one of embodiments 30-31, wherein the heat-pressing comprises heating the powder to a temperature of from about 110° C. to about 175° C. and then pressing the powder into a PECA polymer.

33. The method of any one of embodiments 30-32, wherein the depolymerizing and repolymerizing is repeated at least two times, at least three times, or at least four times.

34. A method of recycling a poly(ethyl cyanoacrylate) plastic comprising depolymerizing the poly(ethyl cyanoacrylate) plastic into an ethyl cyanoacrylate monomer; and repolymerizing the ethyl cyanoacrylate monomer into poly(ethyl cyanoacrylate) plastic.

35. The method of embodiment 34, wherein the depolymerization comprises combining the poly(ethyl cyanoacrylate) plastic with a reagent; heating the poly(ethyl cyanoacrylate) plastic and reagent; and then extracting the ethyl cyanoacrylate monomer.

36. The method of embodiment 35, wherein the extracting occurs by distillation.

37. The method of any one of embodiments 35-36, wherein the reagent comprises hydroquinone, molecular sieves, sodium sulfate, magnesium sulfate, calcium carbonate, or phosphorus pentoxide, or a combination thereof.

38. The method of any one of embodiments 35-37, wherein the poly(ethyl cyanoacrylate) plastic and reagent are heated to a temperature of from about 180° C. to about 220° C.

39. The method of any one of embodiments 34-38, wherein the depolymerization yields at least about 75%, at least about 80%, at least about 85%, at least about 90% monomer.

40. The method of any one of embodiments 34-39, wherein the repolymerization comprises combining the ethyl cyanoacrylate monomer with an initiator to form a poly(ethyl cyanoacrylate), and curing the poly(ethyl cyanoacrylate) to form a plastic.

41. The method of embodiment 40, wherein the initiator comprises a tertiary amine, a phosphine, an amine, an amine oxide, a betaine, a sulfoxide, or combinations thereof.

42. The method of any one of embodiments 40-41, wherein the initiator comprises dimethylformamide, trimethyl amine N-oxide, trimethylglycine, or dimethyl sulfoxide, or a combination thereof.

43. The method of any one of embodiments 40-42, wherein the repolymerizing occurs at ambient temperature.

44. The method of any one of embodiments 40-42, wherein the repolymerizing occurs at a temperature below ambient.

45. The method of any one of embodiments 40-44, wherein the curing occurs at ambient temperature.

46. The method of any one of embodiments 40-44, wherein the curing occurs at a temperature above ambient.

47. The method of any one of embodiments 40-46, wherein the repolymerizing occurs in a vessel comprising poly polyethylene or polypropylene.

48. The method of any one of embodiments 40-47, wherein the curing occurs in a vessel comprising poly(ethylene) or poly(propylene).

49. The method of any one of embodiments 40-48, wherein the ethyl cyanoacrylate is combined with sub-stoichiometric quantities of the initiator.

50. The method of any one of embodiments 40-49, wherein the repolymerization takes at least about 1 hour, at least about 6 hours, at least about 12 hours, at least about 24 hours, or at least about 48 hours.

51. The method of any one of embodiments 40-50, wherein the curing takes about 24 hours, or at least about 24 hours.

52. The method of any one of embodiments 40-51, wherein the repolymerization further comprises annealing the poly(ethyl cyanoacrylate).

53. The method of embodiment 52, wherein the annealing occurs at a temperature of from about 120° C. to about 150° C.

54. The method of any one of embodiments 52-53, wherein the annealing occurs at a temperature of about 130° C.

55. The method of any one of embodiments 52-54, wherein the annealing takes from about 1 minute to about 60 minutes.

56. The method of any one of embodiments 52-55, wherein the annealing takes from about 10 minutes to about 30 minutes.

57. The method of any one of embodiments 52-56, wherein the repolymerized poly(ethyl cyanoacrylate) plastic comprises a tensile strength of from about 15 MPa to about 30 MPa.

58. The method of any one of embodiments 34-57, wherein the repolymerized poly(ethyl cyanoacrylate) plastic comprises an average molecular weight of from about 50 kDa to about 5,000 kDa.

59. The method of any one of embodiments 34-58, wherein the repolymerized poly(ethyl cyanoacrylate) plastic comprises an average polydispersity index of about 1.0 to about 1.4.

60. The method of any one of embodiments 34-59, wherein the poly(ethyl cyanoacrylate) plastic is a part of a waste stream comprising other plastics, contaminants, or combinations thereof.

61. The method of embodiment 60, wherein the other plastics comprise acrylonitrile butadiene styrene (ABS), poly(propylene) (PP), poly(carbonate) (PC), poly(styrene) (PS), poly(ethylene terephthalate) (PET), low-density poly (ethylene) (LDPE), high-density poly(ethylene) (HDPE), poly(lactic acid) (PLA), poly(vinyl chloride) (PVC), or poly(methyl methacrylate) (PMMA), or combinations thereof.

62. The method of any one of embodiments 60-61, wherein the contaminants comprise metal, food, paper, or adhesives, or combinations thereof.

63. The method of any one of embodiments 60-62, wherein the depolymerization yields at least about 50%, at least about 60%, at least about 70%, at least about 75% monomer.

64. The method of any one of embodiments 60-62, wherein the poly(ethyl cyanoacrylate) and other plastics are separated from the contaminants prior to depolymerization.

65. The method of embodiment 64, wherein the depolymerization yields at least about 75%, at least about 80%, at least about 85%, at least about 90% monomer.

66. A plastic material comprising the repolymerized poly (ethyl cyanoacrylate) plastic prepared by the method of any one of embodiments 30-65.

67. An article or product comprising the repolymerized poly(ethyl cyanoacrylate) plastic prepared by the method of any one of embodiments 30-65.

68. A plastic material comprising poly(ethyl cyanoacrylate), wherein the plastic has an average molecular mass of at least about 50 kDa, and wherein the plastic has an average polydispersity index of about 1.0 to about 1.4.

69. The plastic material of embodiment 68, wherein the plastic has an average molecular mass of from about 50 kDA to about 5,000 kDa, or from about 100 to about 2,000 kDa.

70. The plastic material of embodiment 68, wherein the plastic has an average molecular mass of at least about 100 kDa, at least about 1,000 kDa, or at least about 5,000 kDa.

71. The plastic material of any one of embodiments 68-70, wherein the plastic has a polydispersity index of from about 1.02 to about 1.3.

72. The plastic material of any one of embodiments 68-71, wherein the plastic has a tensile strength of from about 15 MPa to about 30 MPa, or from about 17 MPa to about 27 MPa.

73. The plastic material of any one of embodiments 68-72, wherein the plastic has a compressive strength of from about 30 MPa to about 70 MPa, or from about 40 MPa to about 60 MPa.

74. The plastic material of any one of embodiments 68-73, wherein the plastic has an elongation at break percentage of from about 20% to about 50%, or from about 32% to about 46%.

75. The plastic material of any one of embodiments 68-74, wherein the plastic has a density of from about 1 g/mL to about 2 g/mL, or from about 1.05 g/mL to about 1.2 g/mL.

76. The plastic material of any one of embodiments 68-75, wherein the plastic a Hardness Short D value of from about 60 to about 80, or from about 65 to about 75.

77. The plastic material of any one of embodiments 68-76, wherein the plastic has a Young's Modulus of from about 0.15 GPa to about 0.5 GPa, or from about 0.2 GPa to about 0.4 GPa.

78. The plastic material of any one of embodiments 68-77, wherein the plastic has a glass transition temperature of from about 105° C. to about 115° C., or of about 110° C.

79. The plastic material of any one of embodiments 68-74, wherein the plastic comprises an additional component.

80. The plastic material of embodiment 79, wherein the additional component comprises a dye, a pigment, a fragrance, a solvent, a carrier, a thickener, a solidifying agent, a clarifying agent, or a decoration, or mixtures thereof.

81. The plastic material of any one of embodiments 79-80, wherein the additional ingredient is non-toxic.

82. The plastic material of any one of embodiments 68-81, wherein the plastic does not comprise a plasticizer.

83. An article or product comprising the plastic material of any one of embodiments 68-82.

What is claimed is:

1. A method for preparing a poly(ethyl cyanoacrylate) plastic comprising:
polymerizing an ethyl cyanoacrylate monomer by combining the ethyl cyanoacrylate monomer with an initiator comprising a tertiary amine, a phosphine, an amine, an amine oxide, a betaine, a sulfoxide, or combinations thereof to form a poly(ethyl cyanoacrylate), and
curing the poly(ethyl cyanoacrylate) to form a poly(ethyl cyanoacrylate) plastic,
wherein the curing occurs in a mold to prepare a product or article comprising the poly(ethyl cyanoacrylate) plastic or the method further comprises thermoforming the poly(ethyl cyanoacrylate) plastic into an article or product.

2. The method of claim 1, wherein the initiator comprises dimethylformamide, trimethyl amine N-oxide, trimethylglycine, or dimethyl sulfoxide, or a combination thereof.

3. The method of claim 1, wherein the polymerizing occurs at ambient temperature or below, and wherein the curing occurs at ambient temperature or above.

4. The method of claim 1, wherein the polymerization and/or curing occurs in a vessel comprising poly(ethylene) or poly(propylene).

5. The method of claim 1, wherein the ethyl cyanoacrylate is combined with sub-stoichiometric quantities of the initiator.

6. The method of claim 1, wherein the method further comprises annealing the poly(ethyl cyanoacrylate) at a temperature of from about 120° C. to about 150° C. for about 1 minute to about 60 minutes.

7. The method of claim 6, wherein the poly(ethyl cyanoacrylate) plastic comprises a tensile strength of from about 15 MPa to about 30 MPa, an elongation at break percentage of from about 20% to about 50%, a Hardness Shore D value of from about 60 to about 80, a density of from about 1 g/mL to about 2 g/mL, an average molecular weight of from about 50 kDa to about 5,000 kDa, and an average polydispersity index of about 1.0 to about 1.4.

8. The method of claim 1, wherein the polymerization further comprises an additional component comprising a dye, a pigment, a fragrance, a solvent, a carrier, a thickener, a solidifying agent, a clarifying agent, a decoration, or mixtures thereof.

9. An article or product comprising the poly(ethyl cyanoacrylate) plastic prepared by the method of claim 1.

10. A method for recycling the poly(ethyl cyanoacrylate) plastic of claim 1 comprising:
mechanical depolymerizing the poly(ethyl cyanoacrylate) plastic via mechanical forces;
repolymerizing poly(ethyl cyanoacrylate) plastic by heat pressing; and
optionally repeating the depolymerizing and repolymerizing at least two times, at least three times, or at least four times.

11. The method of claim 10, wherein the mechanical forces comprise grinding or milling the poly(ethyl cyanoacrylate) plastic into a powder, and wherein the heat-pressing comprises heating the powder to a temperature of from about 110° C. to about 175° C. and then pressing the powder into a PECA polymer.

12. A method of recycling a poly(ethyl cyanoacrylate) plastic comprising:
depolymerizing the poly(ethyl cyanoacrylate) plastic into an ethyl cyanoacrylate monomer by combining the poly(ethyl cyanoacrylate) plastic with a reagent comprising hydroquinone, molecular sieves, sodium sulfate, magnesium sulfate, calcium carbonate, or phosphorus pentoxide, or a combination thereof, heating the poly(ethyl cyanoacrylate) plastic and reagent to a temperature of from about 180° C. to about 220° C., and extracting the ethyl cyanoacrylate monomer; and
repolymerizing the ethyl cyanoacrylate monomer into poly(ethyl cyanoacrylate) plastic by combining the ethyl cyanoacrylate monomer with an initiator comprising a tertiary amine, a phosphine, an amine, an amine oxide, a betaine, a sulfoxide, or combinations thereof to form a poly(ethyl cyanoacrylate), and curing the poly(ethyl cyanoacrylate) to form a repolymerized poly(ethyl cyanoacrylate) plastic.

13. The method of claim 12, wherein the extracting occurs by distillation, and wherein the depolymerization yields at least about 75% monomer.

14. The method of claim 12, wherein the initiator comprises dimethylformamide, trimethyl amine N-oxide, trimethylglycine, or dimethyl sulfoxide, or a combination thereof and wherein the ethyl cyanoacrylate is combined with sub-stoichiometric quantities of the initiator.

15. The method of claim 12, wherein the repolymerizing occurs at ambient temperature or below, and wherein the curing occurs at ambient temperatures or above, and/or wherein the repolymerizing and/or curing occurs in a vessel comprising poly(ethylene) or poly(propylene).

16. The method of claim 12, wherein the repolymerization further comprises annealing the poly(ethyl cyanoacrylate) at a temperature of from about 120° C. to about 150° C. for about 1 minute to about 60 minutes.

17. The method of claim 12, wherein the repolymerized poly(ethyl cyanoacrylate) plastic comprises a tensile strength of from about 15 MPa to about 30 MPa, an average molecular weight of from about 50 kDa to about 5,000 kDa, an average polydispersity index of about 1.0 to about 1.4.

18. The method of claim 12, wherein the poly(ethyl cyanoacrylate) plastic is a part of a waste stream comprising other plastics, contaminants, or combinations thereof and yields at least about 50% monomer, and optionally wherein the poly(ethyl cyanoacrylate) and other plastics are separated from the contaminants prior to depolymerization and the depolymerization yields at least about 75% monomer.

19. An article or product comprising the repolymerized poly(ethyl cyanoacrylate) plastic prepared by the method of claim 12.

* * * * *